United States Patent [19]
Meyer et al.

[11] Patent Number: 5,350,929
[45] Date of Patent: Sep. 27, 1994

[54] ALIGNMENT SYSTEM FOR MULTIPLE COLOR PEN CARTRIDGES

[75] Inventors: William D. Meyer, Ramona; Jeffrey A. Sunamoto; Mark W. Majette, both of San Diego, all of Calif.

[73] Assignee: Hewlett-Packard Company, Palo Alto, Calif.

[21] Appl. No.: 131,795

[22] Filed: Oct. 4, 1993

Related U.S. Application Data

[62] Division of Ser. No. 878,958, May 4, 1992, Pat. No. 5,276,467.

[51] Int. Cl.$^5$ .................. G01D 18/00; G01V 9/04
[52] U.S. Cl. .................. 250/573; 250/222.1; 349/7
[58] Field of Search .............. 250/561, 216, 573, 221, 250/222.1; 346/140 R, 140 IJ, 140 PD

[56] References Cited

U.S. PATENT DOCUMENTS

| | | | |
|---|---|---|---|
| 4,493,993 | 1/1985 | Kanamuller et al. | 250/222.1 |
| 4,922,268 | 5/1990 | Osborne | 346/140 R |
| 4,922,270 | 5/1990 | Cobbs et al. | 346/140 R |
| 4,963,882 | 10/1990 | Hickman | 346/1.1 |
| 4,965,593 | 10/1990 | Hickman | 346/140 R |
| 5,036,340 | 7/1991 | Osborne | 346/140 R |
| 5,255,009 | 10/1991 | Bauer | 346/140 R |
| 5,276,467 | 1/1994 | Meyer et al. | 346/1.1 |

*Primary Examiner*—David C. Nelms
*Assistant Examiner*—John R. Lee

[57] ABSTRACT

A multiple printhead cartridge color thermal ink jet printer having apparatus for measuring the offsets between the multiple printhead cartridges each of which includes a nozzle array of one or more columns of nozzles, each column being parallel to the media axis of the printer. The cartridges are individually operated, stationarily and while scanning, to fire drops at an aperture plate interposed between an optical drop detector and the nozzle arrays of the printhead cartridges. The detection of drops passing through the aperture plate and the non-detection of drops blocked by the aperture plate provide information which is utilized in conjunction with the nature of the operation of the cartridges that produced the detected drops to determine the positions of the nozzle arrays of the cartridges relative to each other. The optical drop detector includes optical light benders that advantageously positions the optical detection zones of the optical detector closer to the aperture plate, which allows higher drop fire rates to be utilized for offset determination.

4 Claims, 18 Drawing Sheets

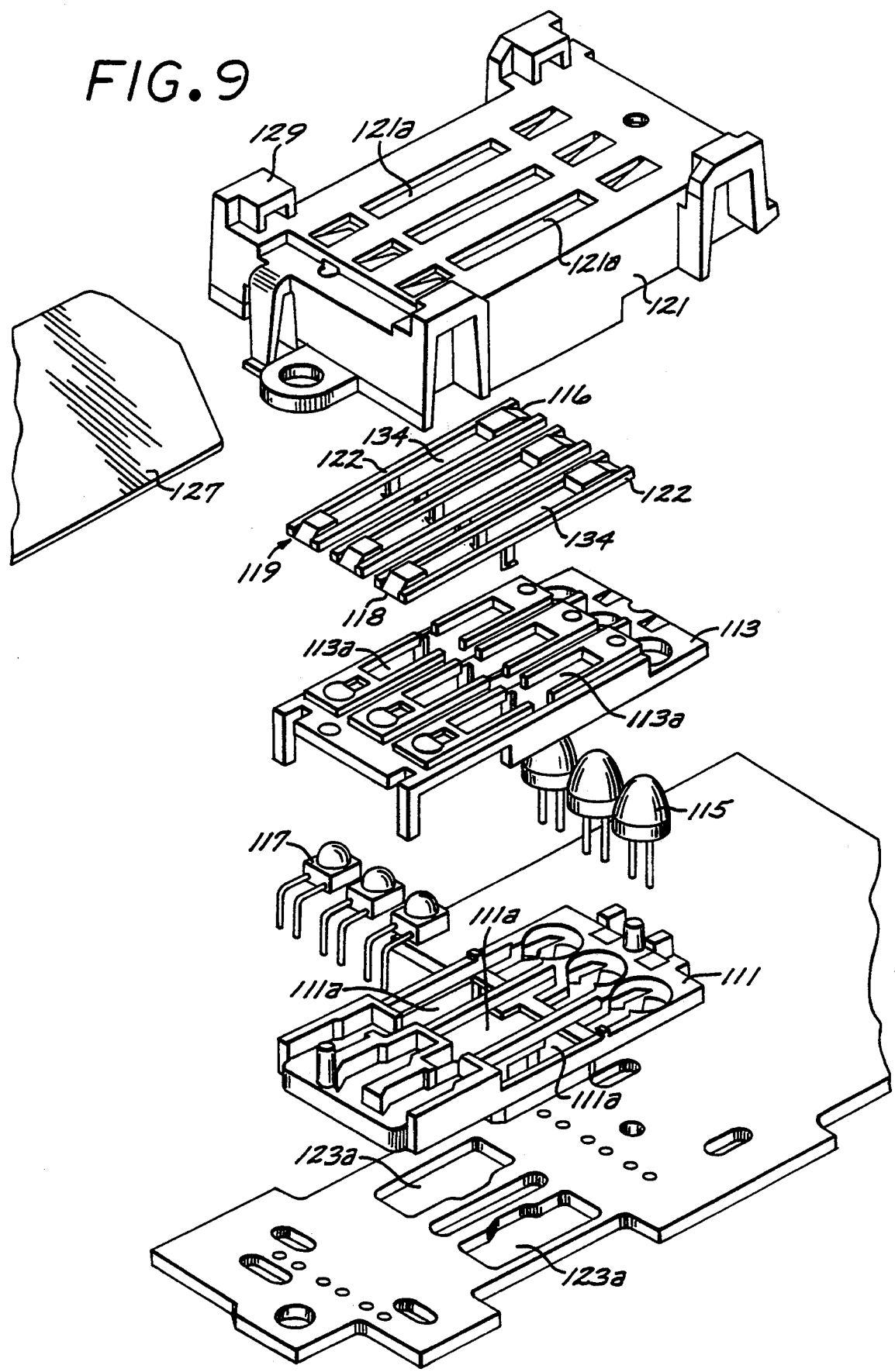

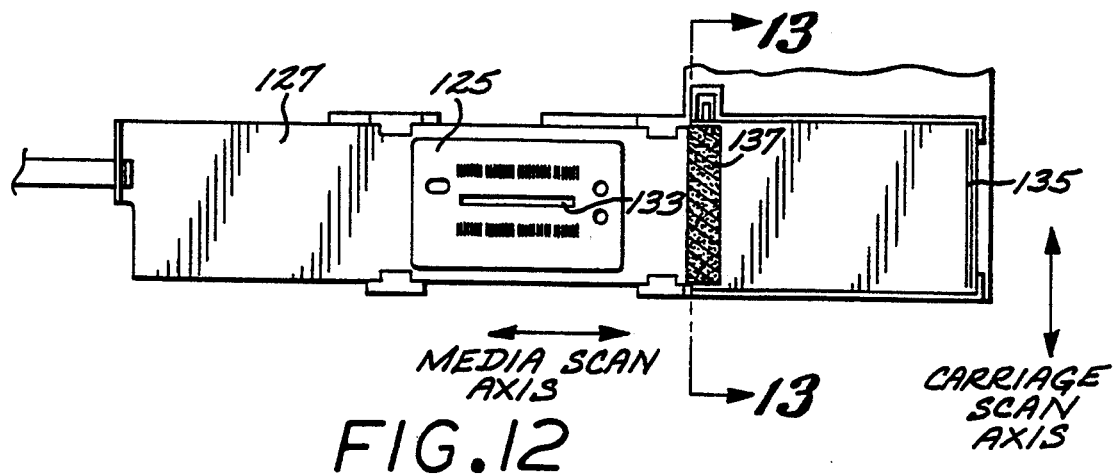
FIG. 12
FIG. 13
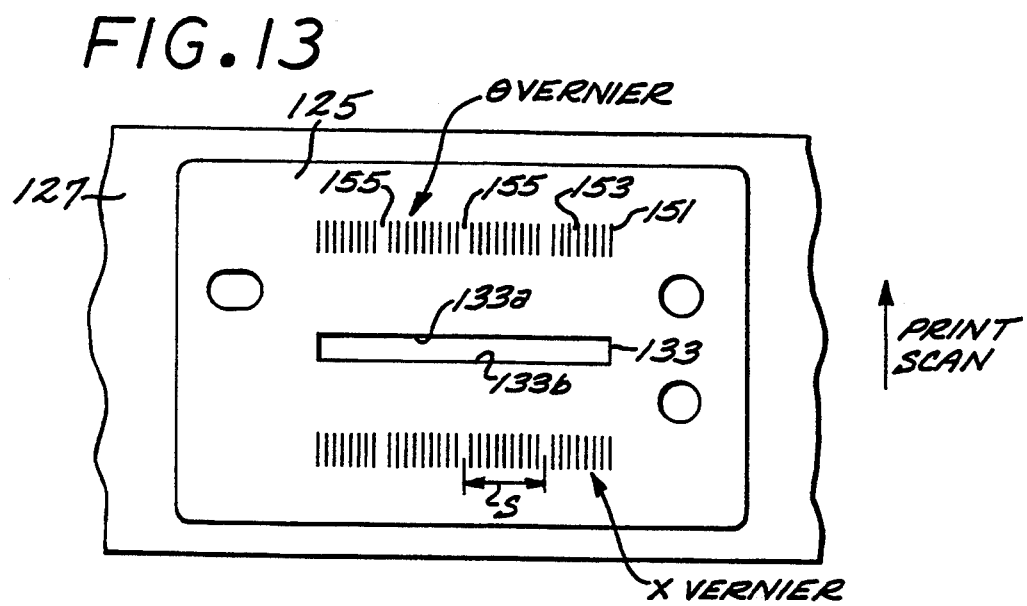
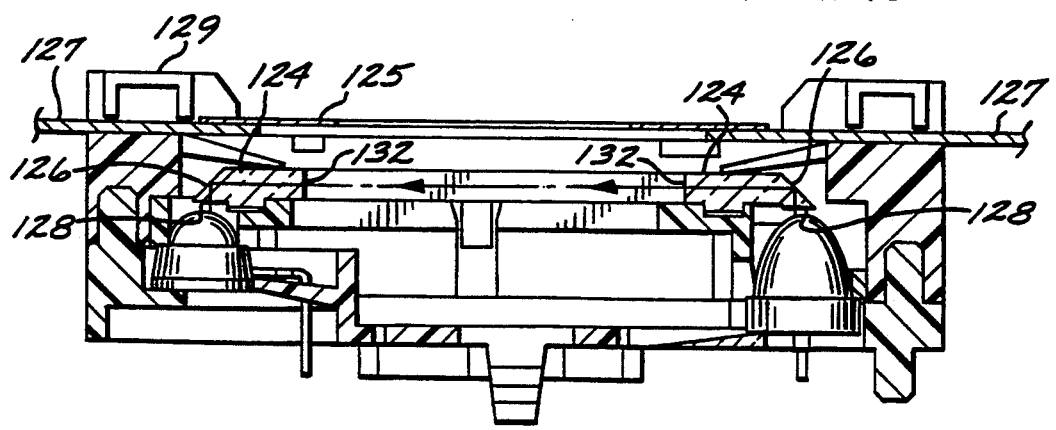
FIG. 14

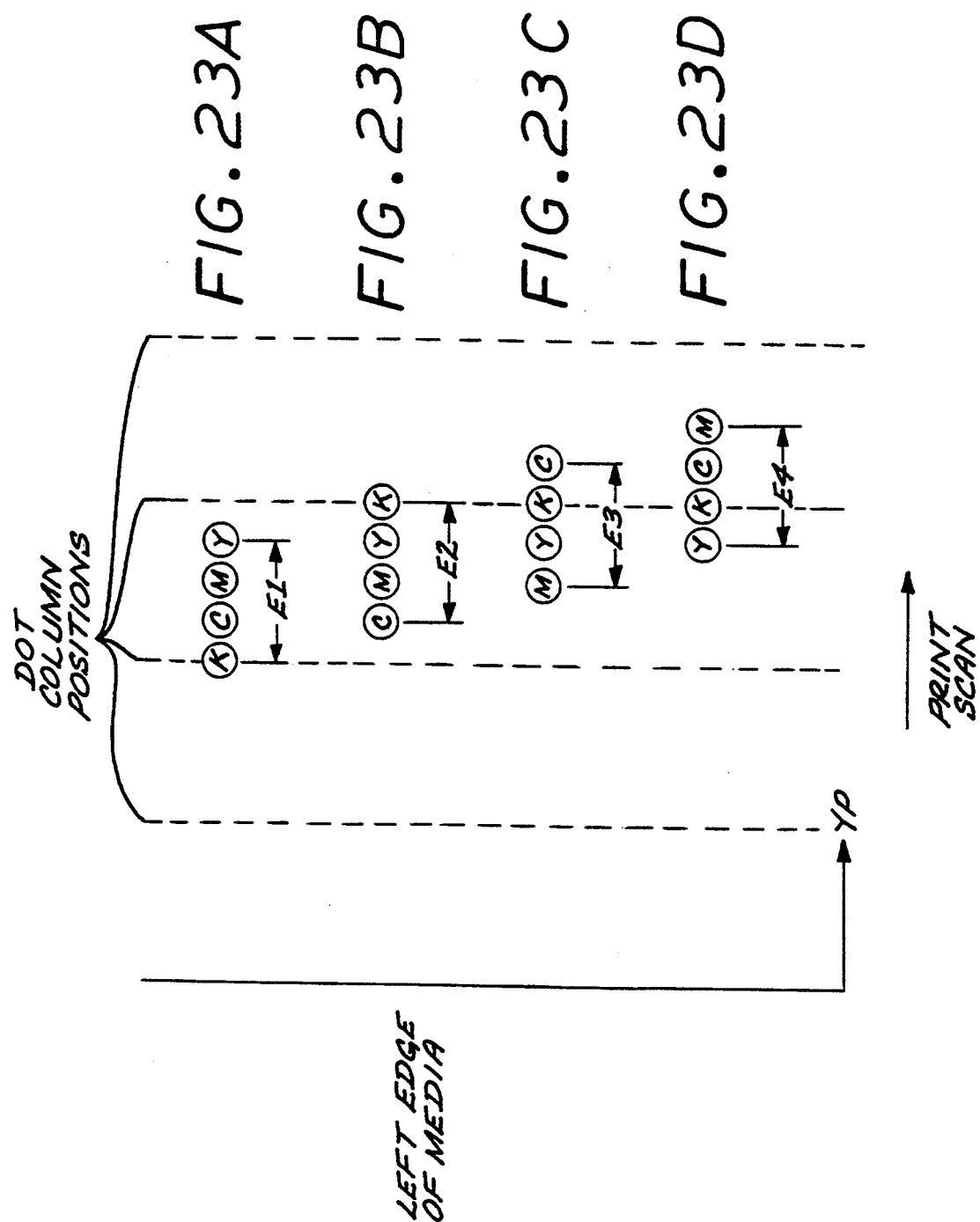

ALIGNMENT SYSTEM FOR MULTIPLE COLOR PEN CARTRIDGES

This is a divisional of copending U.S. patent application Ser. No. 07/878,958, filed May 4, 1992 now U.S. Pat. No. 5,276,467.

This application is related to commonly assigned copending U.S. patent application Ser. No. 07/877,905, filed May 1, 1992, by Richtsmeier, Doan, and Hickman, entitled "STAGGERED PENS IN COLOR THERMAL INK JET PRINTER", incorporated herein by reference; and commonly assigned copending U.S. patent application Ser. No. 07/876,938, filed May 1, 1992 now U.S. Pat. No. 8,255,004 by Bauer, Majette, and Dangelo, entitled "AUTOMATIC MAINTENANCE SYSTEM FOR DROP APERTURE PLATE (OPTICS PROTECTION)," incorporated herein by reference.

BACKGROUND OF THE INVENTION

The subject invention is generally directed to color thermal ink jet printers, and more particularly to apparatus and techniques for improving the print quality of multiple cartridge color thermal ink jet printers.

An ink jet printer forms a printed image by printing a pattern of individual dots at particular locations of an array defined for the printing medium. The locations are conveniently visualized as being small dots in a rectilinear array. The locations are sometimes "dot locations", "dot positions", or "pixels". Thus, the printing operation can be viewed as the filling of a pattern of dot locations with dots of ink.

Ink jet printers print dots by ejecting very small drops of ink onto the print medium, and typically include a movable carriage that supports one or more printheads each having ink ejecting nozzles. The carriage traverses over the surface of the print medium, and the nozzles are controlled to eject drops of ink at appropriate times pursuant to command of a microcomputer or other controller, wherein the timing of the application of the ink drops is intended to correspond to the pattern of pixels of the image being printed.

Color thermal ink jet printers commonly employ a plurality of printheads, for example four, mounted in the print carriage to produce different colors. Each printhead contains ink of a different color, with the commonly used colors being cyan, magenta, yellow, and black. These base colors are produced by depositing a drop of the required color onto a dot location, while secondary or shaded colors are formed by depositing multiple drops of different base color inks onto the same dot location, with the overprinting of two or more base colors producing secondary colors according to well established optical principles.

Print quality is one of the most important considerations of competition in the color ink jet printer field. Since the image output of a color ink jet printer is formed of thousands of individual ink drops, the quality of the image is ultimately dependent upon the quality of each ink drop and the arrangement of the ink drops on the print medium. One source of print quality degradation is insufficient drying of a first deposition ink drop prior to deposit of an overlying second ink drop. A further source of print quality degradation is the lack of precise ink drop placement on the print medium.

SUMMARY OF THE INVENTION

It would therefore be an advantage to provide a multiple printhead color ink jet printer that provides for precise ink dot placement of each of the different printheads.

The foregoing and other advantages are provided by apparatus and techniques for measuring the offsets between the printhead cartridges of a multiple printhead cartridge color thermal ink jet printer wherein each printhead cartridge includes a nozzle array of one or more columns of nozzles, each column being parallel to the media axis of the printer. The cartridges are individually operated, stationarily and while scanning, to fire drops at an aperture plate interposed between an optical drop detector and the nozzle arrays of the printhead cartridges. The detection of drops passing through the aperture plate and the non-detection of drops blocked by the aperture plate provide information which is utilized in conjunction with the nature of the operation of the cartridges that produced the detected drops to determine the positions of the nozzle arrays of the cartridges relative to each other. More particularly, the aperture plate includes an elongated slot and first and second identical vernier patterns on either side of the center slot, wherein each vernier pattern includes a stack of narrow slots which are perpendicular to the elongated slot. The longitudinal axes of the center slot and first and second identical verniers are precisely parallel to each other, and are approximately perpendicular to the carriage axis of the printer. Both verniers are utilized in the measurement of the angular offset of the of the aperture plate relative to the carriage axis, while one of the verniers is utilized in the measurement of media axis offsets. The elongated slot is utilized in the measurement of carriage axis offsets which are compensated for the angular offset of the aperture plate. Row and column data shifts are determined from the measured offsets in a manner that reduces the spread between the respective dot print positions of the cartridges at each dot position.

The optical drop detector includes optical light benders that advantageously position the optical detection zones of the optical detector closer to the aperture plate, which allows higher drop fire rates to be utilized for offset determination.

BRIEF DESCRIPTION OF THE DRAWINGS

The advantages and features of the disclosed invention will readily be appreciated by persons skilled in the art from the following detailed description when read in conjunction with the drawing wherein:

FIG. 9 is an exploded perspective view illustrating the drop detector of the assembly of FIG. 8.

FIG. 12 is a top plan view illustrating the relation of the aperture plate and the aperture plate maintenance components of the assembly of FIG. 8.

FIG. 13 is a top plan view of the aperture plate of the assembly of FIG. 8.

FIG. 14 is a side elevational view illustrating the location of the optical detection zones of the drop detector of FIG. 9 relative to the aperture plate utilized therewith.

FIGS. 23A, 23B, 23C, 23D schematically illustrate print position calculations performed to determine the optimal data shifts implemented to compensate the measured offsets between the multiple printhead cartridges of the printer of FIG. 1.

DETAILED DESCRIPTION OF THE DISCLOSURE

Figure 1:
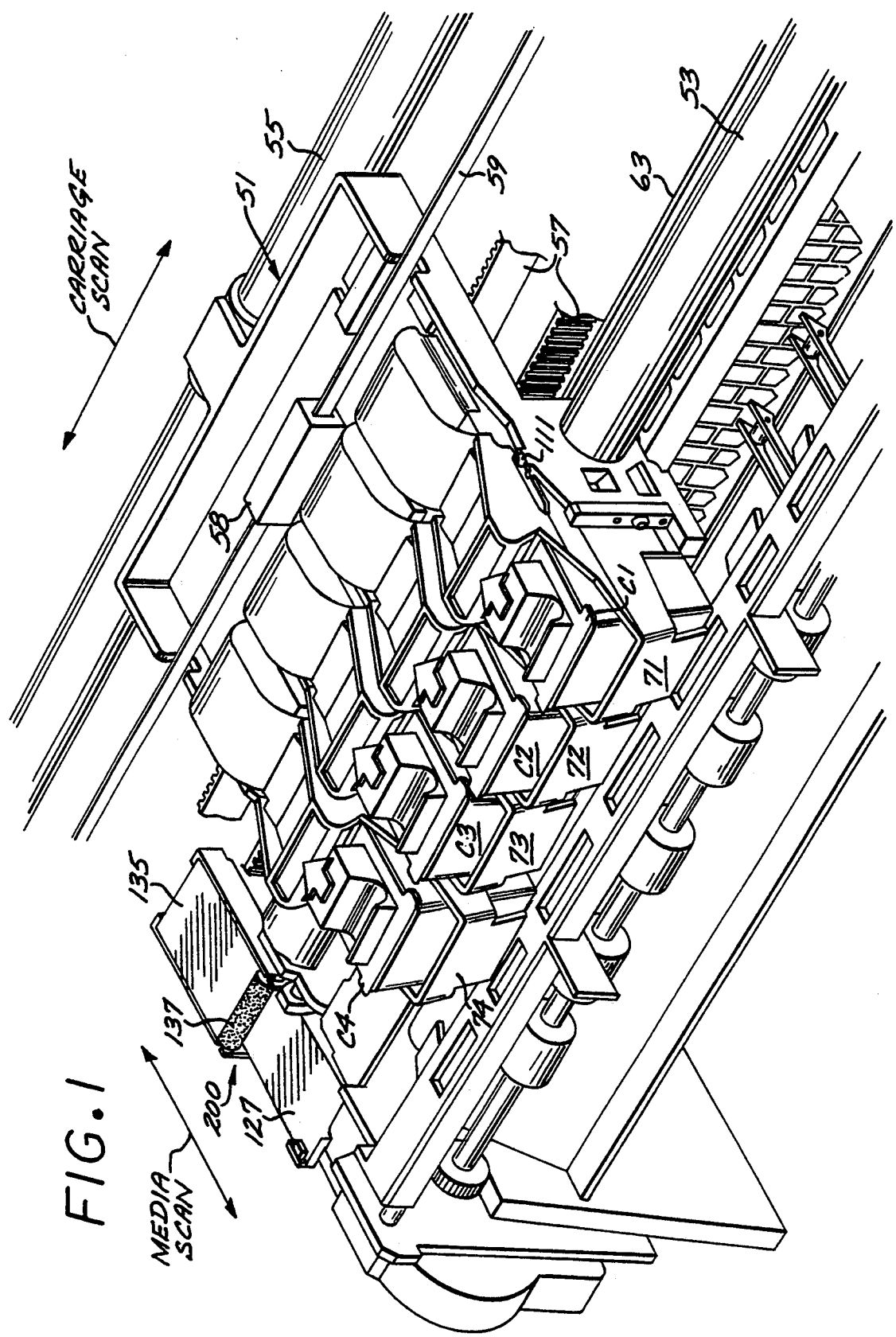
FIG. 1 is a schematic top plan view of the major mechanical components of a multiple printhead color ink jet printer in accordance with the invention.

In the following detailed description and in the several figures of the drawing, like elements are identified with like reference numerals.

The subject invention is preferably implemented in a heated printing environment such as disclosed in commonly assigned U.S. patent application Ser. No. 07/876,924, filed May 1, 1992, by Richtsmeier, Russell, Medin, Bauer, Cundiff, and Glassett, entitled "HEATER BLOWER SYSTEM IN A COLOR INK-JET PRINTER,", incorporated herein by reference.

Figure 2:
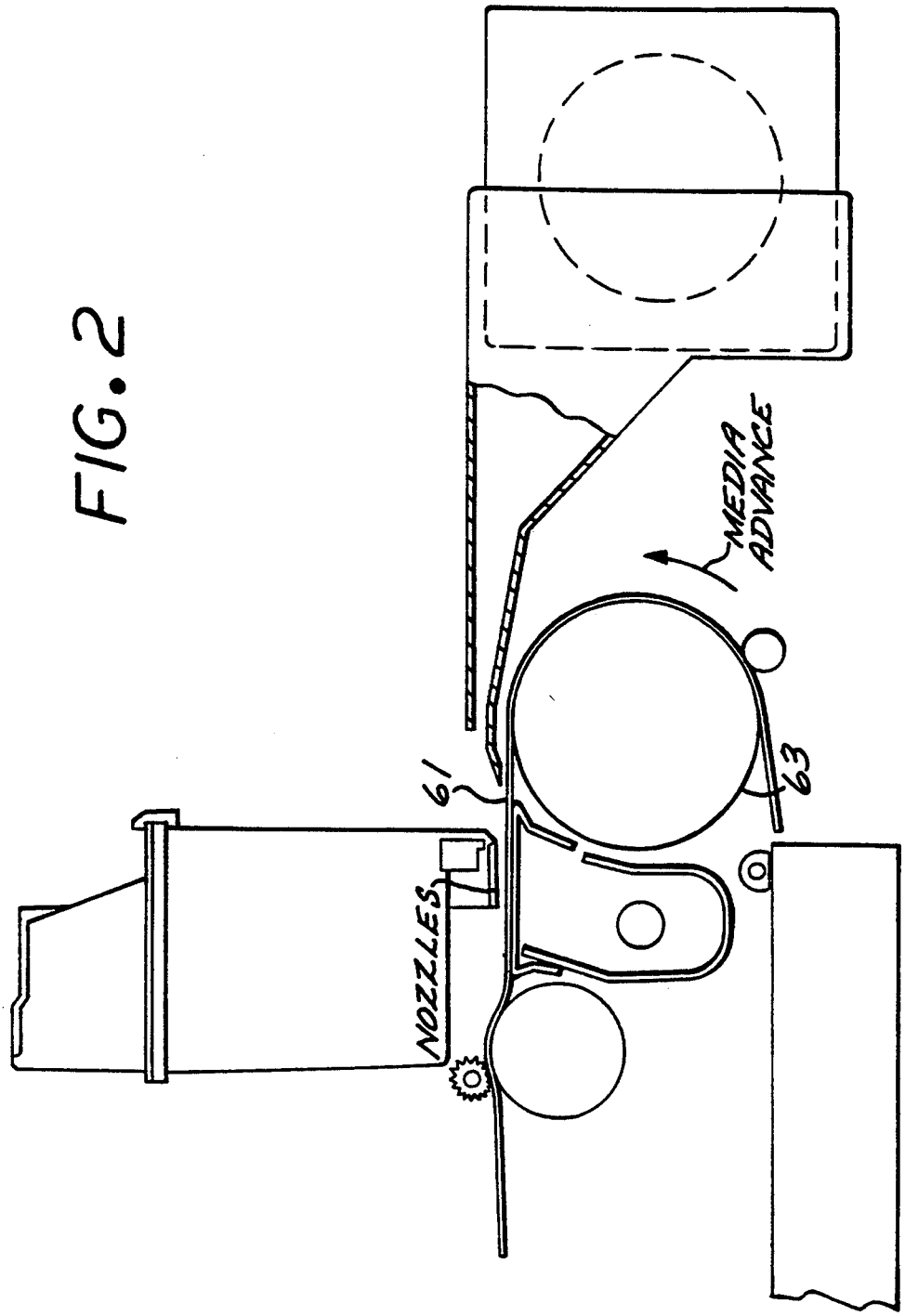
FIG. 2 is a schematic side elevational sectional view illustrating, for one of the printheads of the printer of FIG. 1, the relation between the downwardly facing ink jet nozzles and the print media of the color ink printer of FIG. 1.

Referring now to FIGS. 1 and 2, set forth therein are a schematic top plan view and a schematic side elevational sectional view illustrating, by way of illustrative example, major mechanical components of a multiple printhead color ink jet printer employing the invention. The printer includes a movable carriage 51 mounted on guide rails 53, 55 for translational movement along the carriage scan axis (commonly called the Y-axis in the printer art). The carriage 51 is driven along the guide rails 53, 55 by an endless belt 57 which can be driven in a conventional manner, and an encoder module 58 on the carriage 51 senses a linear encoder strip 59 to detect position of the carriage 51 along the carriage scan axis, for example in accordance with conventional techniques.

The carriage 51 supports four printhead cartridge retaining chutes 91 located at the front of the carriage 51 for retaining removable first through fourth ink jet printhead cartridges C1, C2, C3, C4 (sometimes called "pens," "print cartridges," or "cartridges") which are externally substantially identical. The printhead cartridges C1, C2, C3, C4 include downwardly facing nozzles for downwardly ejecting ink to a print medium 61 which lies on a support print screen 65 located below the printhead cartridges. As shown in FIG. 2 for one of the printhead cartridges, the print media 61 advances along the media scan axis from beneath a print roller 63 pursuant to rotational cooperation thereof with other appropriate rollers, for example as disclosed in the previously cited application entitled "HEATER BLOWER SYSTEM IN A COLOR INK-JET PRINTER".

The media scan axis, shown for example in FIGS. 1, 2, and 3, can be considered as being generally tangential to the print media surface that is below the nozzles of the printhead cartridges and orthogonal to the carriage scan axis. It is noted that the media scan axis is sometimes called the "vertical" axis, probably as a result of those printers having printing elements that printed on a portion of the print media that was vertical. Also, the carriage scan axis is sometimes called the "horizontal axis".

Figure 3:
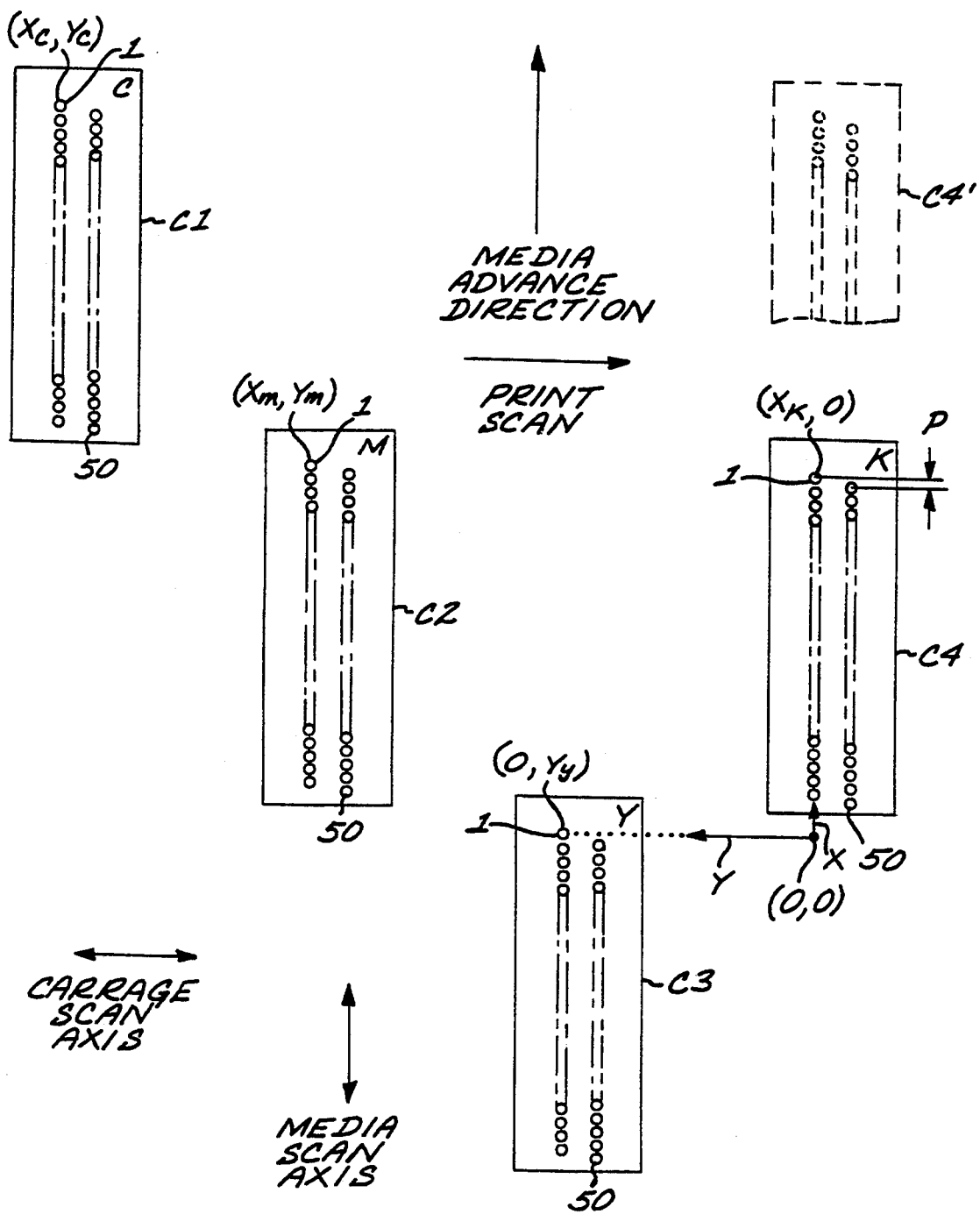
FIG. 3 is a schematic plan view illustrating the staggered arrangement of the nozzle arrays of the printhead cartridges of the printer of FIG. 1.
Figure 4:
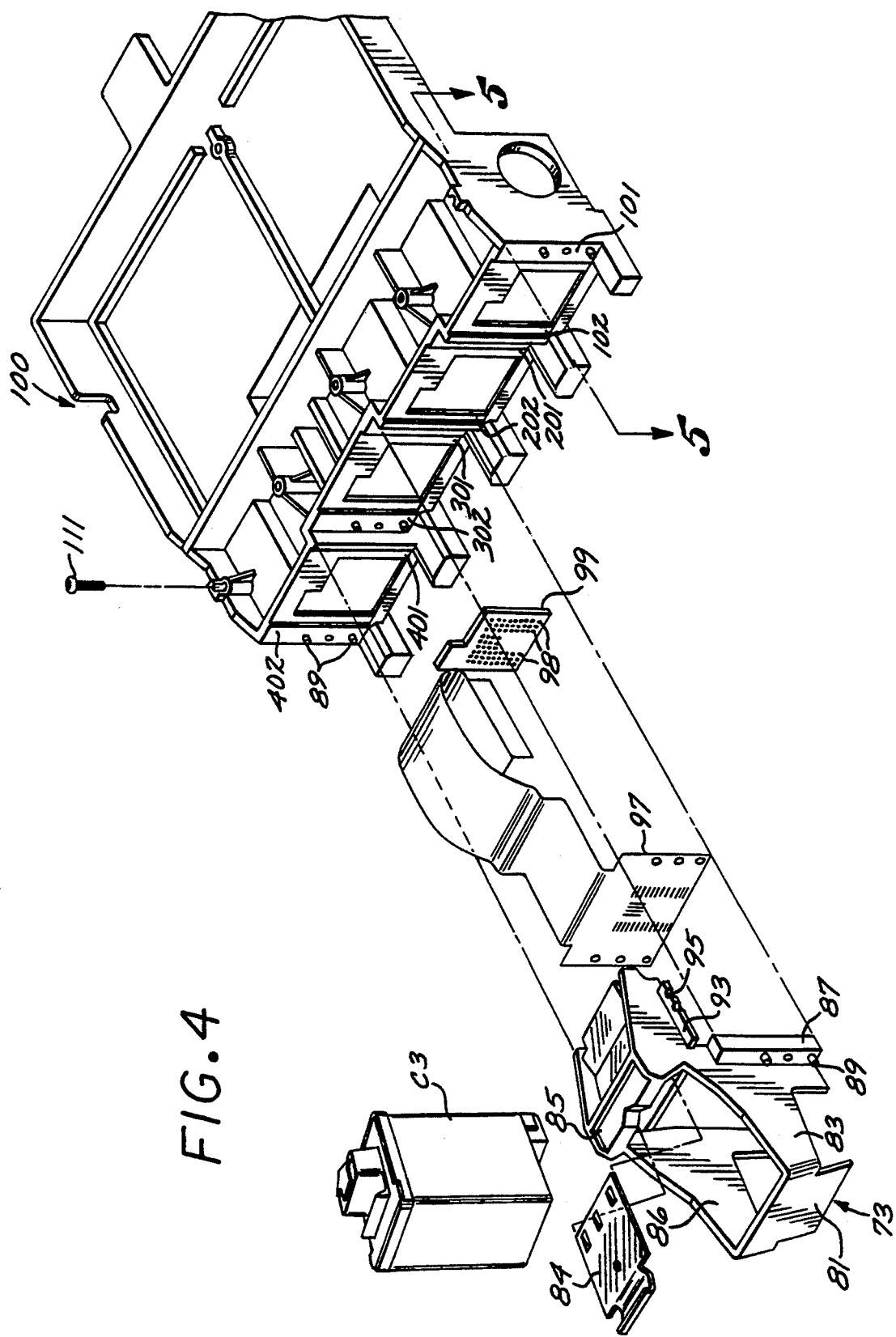
FIG. 4 is a schematic perspective view illustrating the staggered walls of the printhead carriage that support the printhead cartridge retaining structures in an arrangement that provides for a reduced head carriage width.
Figure 5:
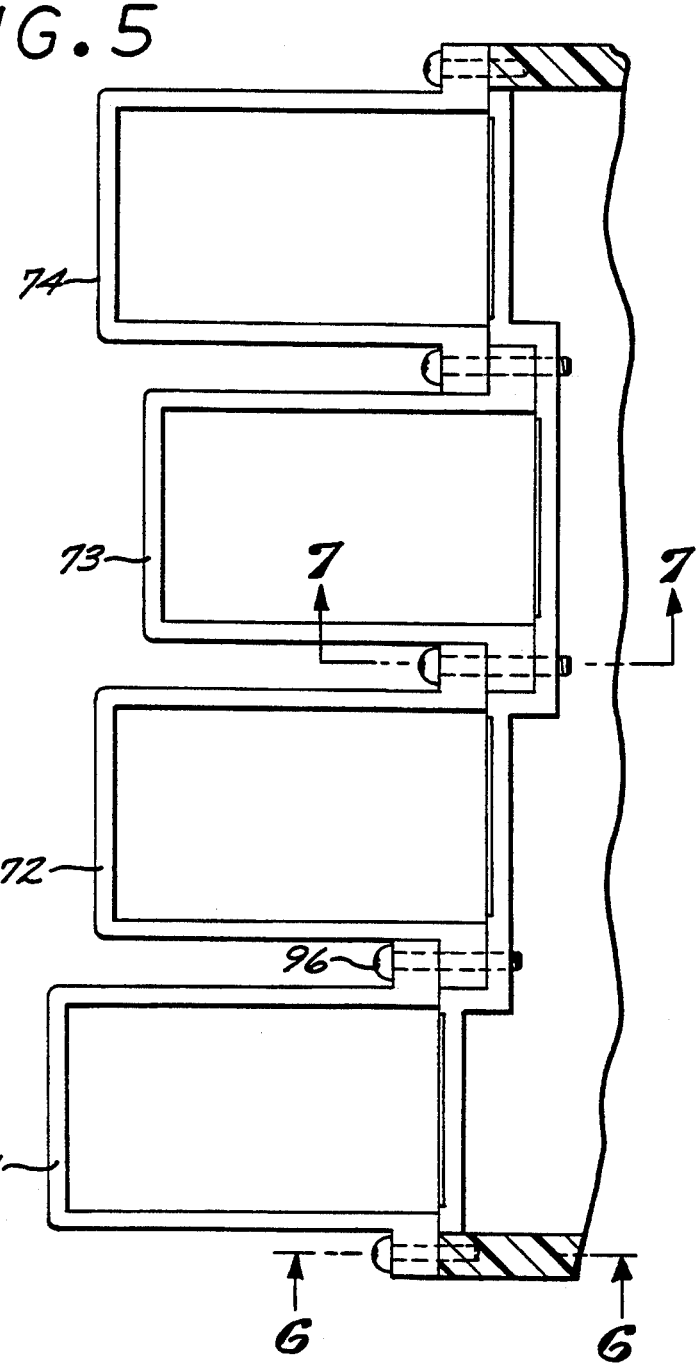
FIG. 5 is a top plan view illustrating the affixation of the printhead cartridge retaining structures to the printhead carriage staggered support walls.
Figure 6:
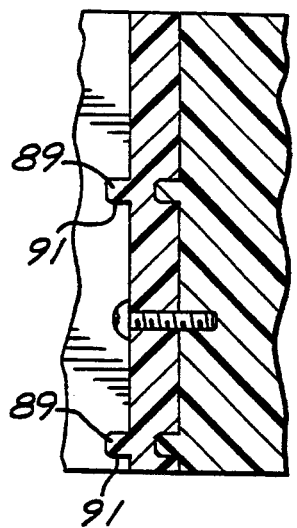
FIG. 6 is a schematic elevational sectional view illustrating the affixation of the outboard flange of a printhead retaining structure that is on the outside of the group of printhead retaining structures.
Figure 7:
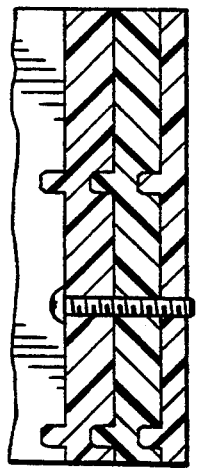
FIG. 7 is a schematic elevational sectional view illustrating the affixation of overlapping flanges of adjacently mounted printhead retaining structures.

The cartridge chutes 71, 72, 73, 74 are side by side along the carriage scan axis and each is offset relative to an immediately adjacent chute along the media scan axis such that the nozzle arrays of the cartridges C1, C2, C3 supported by the cartridge chutes 71, 72, 73 are nonoverlapping along the media scan axis, and the nozzle arrays of the cartridges C2, C4 are closely aligned along the media scan axis, as more particularly shown in FIG. 3. The cartridges C1, C2, C3 comprise non-black color printing cartridges for producing the base colors of cyan, magenta, and yellow commonly utilized in color printing, while the cartridge C4 comprises a black printing cartridge. The staggered arrangement of the pen chutes 71, 72, 73, 74 is readily observed in the sectional top plan view of FIG. 5 which is discussed further herein relative to the structure of the cartridge chutes and their installation on the printhead carriage 51. The amount of stagger or offset along the media axis between the cartridges is discussed more specifically below in conjunction with the spacing of the nozzles of the nozzle arrays.

Referring now to FIG. 3, schematically depicted therein is the arrangement of the nozzle arrays of the cartridges C1, C2, C3, C4 as viewed from above the nozzles of the cartridges (i.e., the print media would be below the plane of the figure). Each nozzle array of the cartridges C1, C2, C3, C4 includes an even number of nozzles arranged in two columns parallel to the media scan axis, wherein the nozzle columns are staggered relative to each other. By way of illustrative example, each nozzle array includes 50 nozzles which are numbered as 1 through 50 with the 50th nozzle being at the end of the nozzle array that is first encountered by the leading edge of a print medium as it is advanced in accordance with the media advance direction shown in FIG. 3 as well as in FIG. 2, by which the leading edge of an advancing print medium first encounters the nozzle array of the printhead cartridge C3, then the nozzle arrays the printhead cartridges C2, C4, and finally the nozzle array of the printhead cartridge C1. Print direction as shown in FIG. 3 is such that the cartridge C3, the yellow print cartridge, is the first cartridge to encounter the print media.

The distance along the media scan axis between diagonally adjacent nozzles of each nozzle array, as indicated by the distance P in FIG. 3 for the cartridge C4, is known as the nozzle pitch, and by way of example is equal to the resolution dot pitch of the desired dot row resolution (e.g., 1/300 inch for 300 dpi). The physical spacing between the nozzle columns, conveniently referred to as even and odd nozzle columns, is precisely controlled, as is the physical spacing between nozzles in each column. These precisely controlled dimensions can be advantageously utilized in determining the offsets between the cartridges C1, C2, C3, C4, as described further herein. In use, the physical spacing between the columns of nozzles in a printhead cartridge is compensated by appropriate data shifts in the swath print data so that the two columns function as a single column of nozzles.

Pursuant to the non-overlapping stagger of the non-black printing cartridges C1, C2, C3 along the media axis, the areas or bands traversed by each of the cyan, magenta and yellow nozzle arrays in each carriage scan are nonoverlapping. In this manner, ink drops ejected by the nonblack cartridges in a given carriage scan do not fall on top of drops ejected in the same carriage scan, and ink drops of the non-black colors are in separate bands in each pass. This allows ink drops to dry before the application of any overlying or adjacent drops of a different color on a subsequent carriage scan and avoids ink bleed due to mixing of liquid ink of different colors. The black cartridge C4 does not need to be offset along the media axis relative to all of the non-black printing cartridges, since dot locations having black dots are not printed with dots of another color. However, as discussed below, the black cartridge should not be aligned with the yellow cartridge along the media axis. Stagger or offset of the cartridges along the media axis also helps to reduce cockle since ink is distributed over a larger area than if the cartridges were side by side in a line along the carriage scan axis.

The amount of offset or stagger along the media axis between nozzle arrays should be at least 2 nozzle pitches to insure sufficient separation between colors in each pass. Thus, each of the media axis offsets between C1 and C2, between C2 and C3, between C3 and C4, and between C4 and C1 should be at least 2 nozzle pitches.

It is noted that for further control of paper cockle, ink bleed, and coalescence, the staggered cartridge arrangement can be utilized in conjunction with known multiple pass print masking, as for example disclosed in commonly assigned U.S. Pat. No. 4,963,992, issued Oct. 16, 1990, to Mark S. Hickman, for "PRINTING OF PIXEL LOCATIONS BY AN INK JET PRINTER USING MULTIPLE NOZZLES FOR EACH PIXEL OR PIXEL ROW," incorporated herein by reference; and in commonly assigned U.S. Pat. No. 4,965,593, issued Oct. 23, 1990, to Mark S. Hickman, for "PRINT QUALITY OF DOT PRINTERS," incorporated herein by reference.

The black printing cartridge C4 can be aligned with the cyan or magenta cartridge, but not with the yellow cartridge, since it is desirable to separate black and yellow ink drops to avoid muddy yellow printed dots. Black and yellow are very different in brightness and any spray ink particles from the black cartridge that rewet yellow dots would cause muddy yellow dots. Thus, for the particular example wherein the cartridges C1, C2, C3 comprise cyan, magenta, and yellow producing cartridges, respectively, identified in FIG. 3 by the designations C, M, and Y, for cyan, magenta, and yellow, the black producing cartridge C4, identified in FIG. 3 by the designation K for black, can be aligned with the magenta cartridge C2 as shown in FIG. 3. It is noted that the black cartridge could be positioned in alignment with the cyan cartridge C1, as shown by a nozzle array C4' depicted in by broken lines in partial form, which would provide for even greater separation between the yellow dots and the black dots applied in each carriage scan.

Referring now to FIGS. 4–7, the cartridge chutes 71, 72, 73, 74 are substantially identical and are secured to the printhead carriage 51 in a manner that provides for a reduced printhead carriage width. As shown for the particular instance of the cartridge chute 73, each chute includes a front wall 81 and side walls 83 which are mirror images of each other. A rearwardly extending top bracket 85 is connected between the top portions of the side walls 83, and can be utilized to support a cartridge retaining leaf spring clip 84. Vertical flanges 87 extend outwardly at the rear terminal edges of the side walls 83. Each flange 87 includes forwardly extending locating pins 89 and locating apertures 91 formed on the back side of the flange in alignment with the locating pins 89. Horizontal flanges 93 extend outwardly from the lower edges of the top bracket 85, and have locating recesses 95 formed therein. The distance between the locating recesses on each flange is approximately equal to the offset between adjacent ones of the chutes 71–74. Appropriate stops are provided within each of the chutes 71–74 for cooperating with retaining leaf spring clips 84 to fixedly position respective cartridges C1 through C4.

The chutes 71–74 are secured by fasteners 95 to or against respective pairs of mounting standoffs 101, 102; 201, 202; 301, 302; 401, 402 formed in a support member 100 of the carriage 51. The standoffs of each standoff pair are coplanar and offset relative to any adjacent standoff pair by the amount of desired offset between the nozzle arrays of adjacent cartridges. The standoffs are of different widths to accommodate the overlap of the flanges of adjacent offset cartridge chutes. In particular, a wide standoff is provided for each flange that does not have an underlying flange of an adjacent chute. A narrow standoff is provided for each flange that overlaps a flange of an adjacent chute. Each wide standoff is for engagement against a flange of a chute, and therefore includes locating pins 89 for engaging corresponding locating recesses 91 of the flange. Thus, the standoffs 101, 102 for the chute 71 are wide and narrow, respectively; the standoffs 201, 202 for the chute 72 are wide and narrow, respectively; the standoffs 301, 302 for the chute 73 are both wide; and the standoffs 401, 402 for the chute 74 are narrow and wide, respectively. By offsetting the chutes 71–74 so that their mounting flanges overlap reduces the width of the carriage 51, which in turn reduces the width of the printer which must be sufficiently wide to permit over-travel of the carriage to insure the printheads cover the full width of the widest print medium for which the printer is designed to accommodate.

As shown for the representative example of the chute 73, each chute is secured against corresponding standoff pairs and any underlying flanges, with the locating recesses 91 engaged in locating pins of an underlying flange of an adjacent chute or in locating pins 89 of a wide standoff 101, 201, 301, 302, or 402. Captured between the flanges of each chute and the underlying surfaces of corresponding standoff pairs and any underlying flanges are edges of respective flexible circuits 97 having contacts engageable by corresponding interconnect contacts on the back of the printhead cartridges installed in the chutes. Resilient pads 99 are located behind the flexible circuits in recesses formed in the respective walls between each of the standoff pairs to apply pressure against the back of the flexible circuits when the cartridges are engaged in the chutes. By way of illustrative example, each resilient pad 99 includes raised bumps 98 at locations that correspond to electrical contact points between a flexible circuit 97 and a cartridge engaged therewith.

The chutes 71–74 are further secured by fasteners 113 which are positioned such that the flanges 93 of adjacent chutes can be secured with a single fastener. This can be achieved as a result of spacing the two semicircular recesses on each flange 93 by the desired offset between adjacent cartridges.

Figure 8:
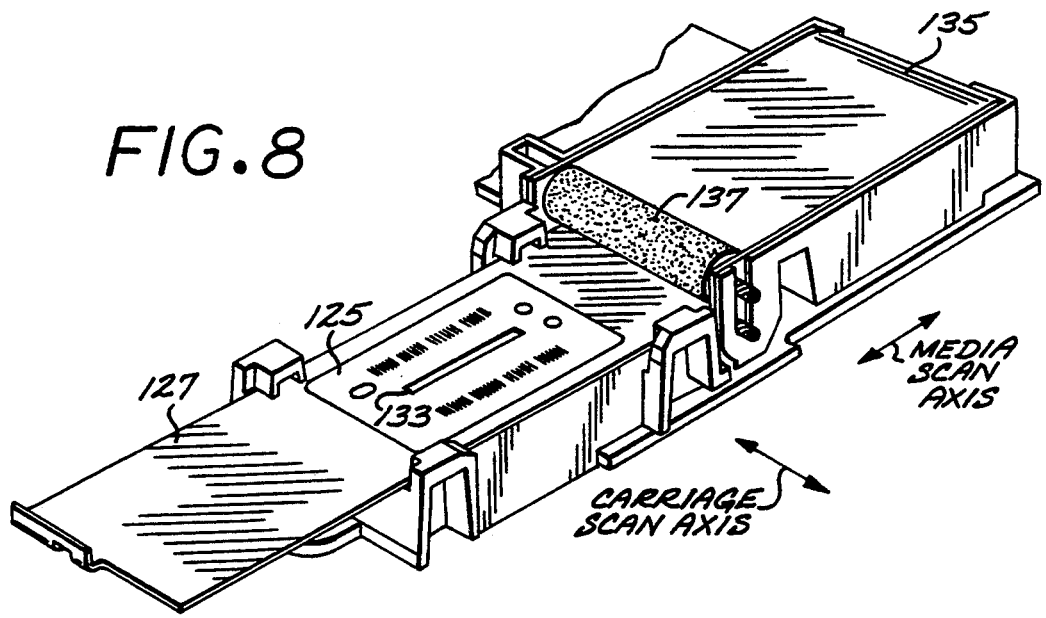
FIG. 8 is a perspective view illustrating an assembly of the printer of FIG. 1 that includes a drop detector, an aperture plate, and maintenance components for cleaning and protecting the aperture plate.

Referring now to FIG. 8, a drop detector assembly is provided for use in determining the offsets between the nozzle arrays of the printhead cartridges C1, C2, C3, C4. The assembly is conveniently located to one side of the media printing area, as shown in FIG. 1, and generally includes a drop detector 200, an overlying aperture plate 125 that is coplanar with the portion of the print medium 61 underlying the nozzle arrays of the cartridges C1, C2, C3, C4, an enclosure 135 for protectively enclosing the aperture plate 125 when not in use, and brushes 137 for cleaning the aperture plate as it is moved into the enclosure 135.

Interpen offsets are determined pursuant to detection of ink drops that pass through the aperture plate as each of the cartridges fires ink drops at the aperture plate, while scanning as well as stationarily positioned, as for example disclosed in commonly assigned U.S. Pat. Nos. 4,922,268; 4,922,270; and 5,036,340, incorporated herein by reference.

Referring now to FIG. 9, the drop detector assembly 200 includes a plurality of substantially identical elongated light bender assemblies 119 which are side by side and parallel to each other in alignment with the media scan axis. Each light bender assembly 119 includes a light bending source prism 116 and a light bending sensor prism 118 which are fixedly spaced apart from each other by elongated support members 122 connected to the sides of the prisms 116, 118 and parallel to the longitudinal axis of the light bender assembly. Each prism includes a top surface 124, an angled surface 126 at a 135 degree included angle relative to the top surface, and a bottom surface 128 beneath the angled surface 126 and parallel to the top surface 124, such that the included angle between the angled surface 126 and the bottom surface 128 is 45 degrees. Each prism further includes an inwardly facing surface 132 that is orthogonal to the longitudinal axis of the light bender assembly.

Respective upwardly facing LEDs 115 are located adjacent the bottom surfaces 128 of the source prisms 116 and respective upwardly facing photodiodes 117 are located adjacent the bottom surfaces of the sensor prisms 118.

Figure 10:
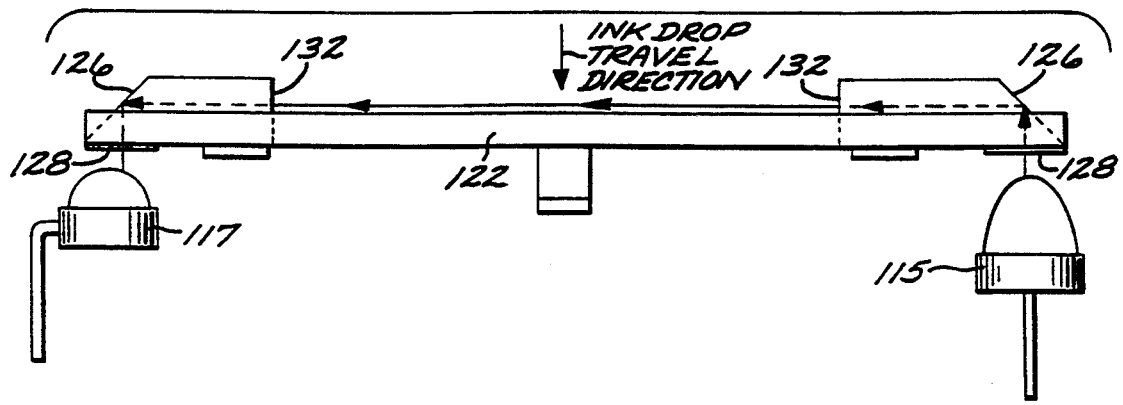
FIG. 10 is a side elevational view schematically illustrating the operation of a light bender assembly of the drop detector of FIG. 9.

As shown more particularly in FIG. 10, the source LED 115 associated with a particular light bender assembly 119 is controlled to provide source illumination that enters the bottom surface 128 of the source prism 116 and is reflected at the angled surface 126 of the source prism pursuant to internal reflection. The internally reflected illumination exits the inward facing surface 132 of the source prism 116, travels along the open region between the supports 122, and enters the inward facing surface 132 of the associated sensor prism 118. The illumination that enters the sensor prism 118 is downwardly reflected at the angled surface 126 of the sensor prism pursuant to internal reflection, and the downwardly reflected illumination exits the bottom surface 128 of the sensor prism 118 and illuminates the photodiode 117 positioned adjacent the bottom surface of the sensor prism. The region between the inwardly facing surfaces of the source and sensor prism of a light bender assembly comprises an optical detection zone 134 for detecting the presence of ink drops, wherein the presence of an ink drop in the optical detection zone 134 of a light bender assembly is detected by reduced light sensed by the photodiode 117 of the light bender assembly.

By employing internal reflection to accomplish light bending, optical coatings are avoided and the source and sensor prisms and the support members can be advantageously manufactured as an integral structure by injection molding which provides for inexpensive parts that can have complex geometries that enhance ease of assembly.

The LEDs 115 and the photodiodes 117 are contained between an lower mount 111 and an upper mount 113 which further cooperates with a top cover 121 to secure the light bender assemblies 119. The top cover 121 includes ink passage slots 121a which are respectively aligned with the respective optical detection zones of the light bender assemblies 119. Ink passage slots 111a, 113a are also formed in the lower and upper mounts 111, 113, in alignment with the optical detection zones of the light benders, wherein the slots in the lower mount 113a extending downwardly through openings 123a in a printed circuit board 123 which supports the assembly comprising the lower and upper supports, the LEDs, the photodiodes, the light benders and the top cover.

Figure 11:
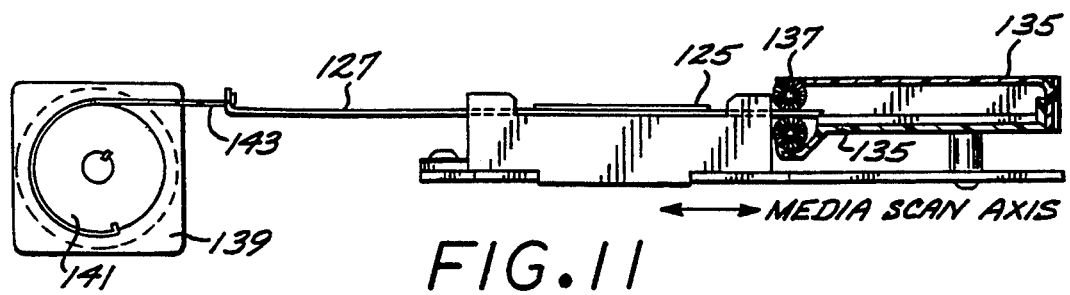
FIG. 11 is side elevational view illustrating the cleaning brushes and the aperture plate enclosure of the assembly of FIG. 8.

Referring now to FIGS. 11 and 12, as well as previously referenced FIG. 8, the ink drop detector 200 is utilized with an aperture plate 125 that is supported at the rear portion of an elongated support plate 127 which is engaged in guides 129 located at the corners of the top cover 121 for sliding displacement thereon parallel to the longitudinal extent of the light bender assemblies 119. When the support plate 127 is displaced forwardly to a forward position, as shown in FIGS. 8 and 11, the aperture plate 125 overlies the drop detector 200. When the support plate 127 is displaced rearwardly to a rearward position so that the aperture plate 125 is behind the drop detector assembly 200, the forward non-apertured portion of the support plate 127 overlies the drop detector (as shown in FIG. 1) and thereby protects the optical elements of the optical detector when not in use from ink, paper dust, and other potentially contaminating materials that may become airborne inside the printer. By way of illustrative example, the support plate is displaced by a stepper motor 139 that turns a gear spool 141 which in turn pulls and pushes a drive strap 143 connected to the forward end of the support plate 127.

For protection of the aperture plate 125 from ink, paper dust and other potentially contaminating materials that might become airborne in the printer, a box like protective housing 135 is located behind and offset relative to the top cover 121 for containing the aperture plate 125 when the supporting plate 127 is displaced rearwardly into an opening in the housing that is adjacent the rear edge of the top cover 121. A pair of cylindrical brushes 137 are located at the opening of the protective housing 135, and are configured to clean ink from the openings in the aperture plate 125 as it is displaced into the protective housing 135 after being used for cartridge offset determination.

Pursuant to the arrangement of the protective housing 135, the elongated support plate 127 and the cylindrical brushes 137, the aperture plate 125 is controllably positioned over the optical detection zones of the light bender assemblies 119 when it is required for determination of the offsets between cartridges. When the aperture plate is no longer needed, it is moved between the brushes 137 and into the protective housing 135. In conjunction with the storage of the aperture plate 125 in the protection housing 135, the non-apertured front portion of the support plate 127 overlies the optical elements of the drop detector to prevent contamination thereof.

FIG. 13 is a detail top plan view of an example of an aperture plate 125 that includes two identical X and $\theta$ vernier aperture patterns on either side of an elongated central slot 133. The verniers and the central slot are positioned in alignment with the top cover slots 121a overlying the optical detection zones 134 of the light bender assemblies 119 when the support plate 127 is in a forward position.

The X and $\theta$ verniers are mirror images of each other across the longitudinal axis of the center slot 133. Each vernier includes narrow parallel slots 151 stacked along the longitudinal axis of the center slot 133, each narrow slot 151 being perpendicular to the center slot 133. In each vernier, the narrow parallel slots are arranged in four sets with wide solid regions 155 between sets being greater than the narrow solid regions 153 between the slots of a set. In accordance with vernier design the widths of the solid regions between the vernier slots 151 are selected to be other than an integral multiple of the nozzle spacing along the media scan axis. The center to center distance S between wide solid regions 155 is made to precisely correspond to the nominal offset between the cartridges along the media axis, and the locations of the wide solid regions correspond to the nominal positions of the centers of the cartridges along the media axis. It should be appreciated that the large solid region in the center of each vernier corresponds to the cartridges C2 and C4 which are nominally aligned along the media axis. The longitudinal axes of the center slot 133 and the X and $\theta$ verniers are made precisely parallel to each other, but are only approximately or closely perpendicular to the carriage axis as a result of mechanical tolerances in the manufacture of the support plate guides 129 of optical detector top cover 121 which can be conveniently molded. For example, the angular offset of the aperture plate relative to perpendicular to the carriage might be about 1–2 degrees.

For use in measurement of offsets between cartridges as described further herein, a longitudinal edge 133a of the center slot 133 shall be referred to as the detect edge, since individual traversal thereof by selected firing nozzles being scanned in the print scan direction will be utilized to determine carriage positions that correspond to the edge traversal by such selected nozzles.

After the aperture plate 125 has been utilized for determination of offsets between the cartridges C1, C2, C3, C4, it can be cleaned of ink build up by firing ink drops at the edges of the apertures in the aperture plate, and then passing the aperture plate through the cleaning brushes a number of times. By way of illustrative example, 50 drops from each nozzle of the magenta and yellow cartridges C2, C3 are applied to a first vernier. Then, 50 drops from each nozzle of the magenta and yellow cartridges are applied to both longitudinal edges of the central slot, or to only the slot edge utilized for edge detection in conjunction with offset determination. After firing of ink drops at the edge or edges of the center slot, ink drops are applied to the second vernier in the same manner as for the first vernier, or 50 drops from each nozzle of the cyan, magenta, and yellow cartridges are applied to the second vernier for the situation where more ink was applied to the second vernier in the course of offset determination. The aperture plate is then parked into the enclosure, unparked out of the enclosure, finally parked in the enclosure, for a total of 3 passes through the brushes.

As a result of the light bender assemblies and the upwardly facing LEDs and photodiodes, the optical detection zones 122 in which ink drops are detectable can be closer to the exit side of the aperture plate 125, as shown in FIG. 14, in comparison to known optical drop detectors in which an optical detection zone is formed by an LED facing an opposing photodiode. By locating the optical detection zones 122 closer to the exit side of the aperture plate 125, drop detection to be reliably performed at higher drop fire rates for the following reasons. When an ink drop leaves a nozzle, it separates in a primary drop and one or more smaller secondary drops. The velocity of the primary drop is greater than the velocities of the second drops, and the distance between the primary drop and the secondary drops increases with distance from the source nozzle. In order to avoid having a primary drop and the secondary drops of a preceding drop in the drop detection zone at the same time, drop fire rate must be sufficiently low such that a primary drop does not enter the detection zone while a secondary drop from a preceding drop is still in the detection zone. Since the distance between a primary drop and its secondary drops increases with distance from the nozzle, drop firing rate must decrease with increased distance of the detection zone from the nozzle. The capability for reliable drop detection at higher drop fire rates translates into reduced time for pen offset determination which is performed by procedures involving the firing and detection of ink drops.

Figure 15:
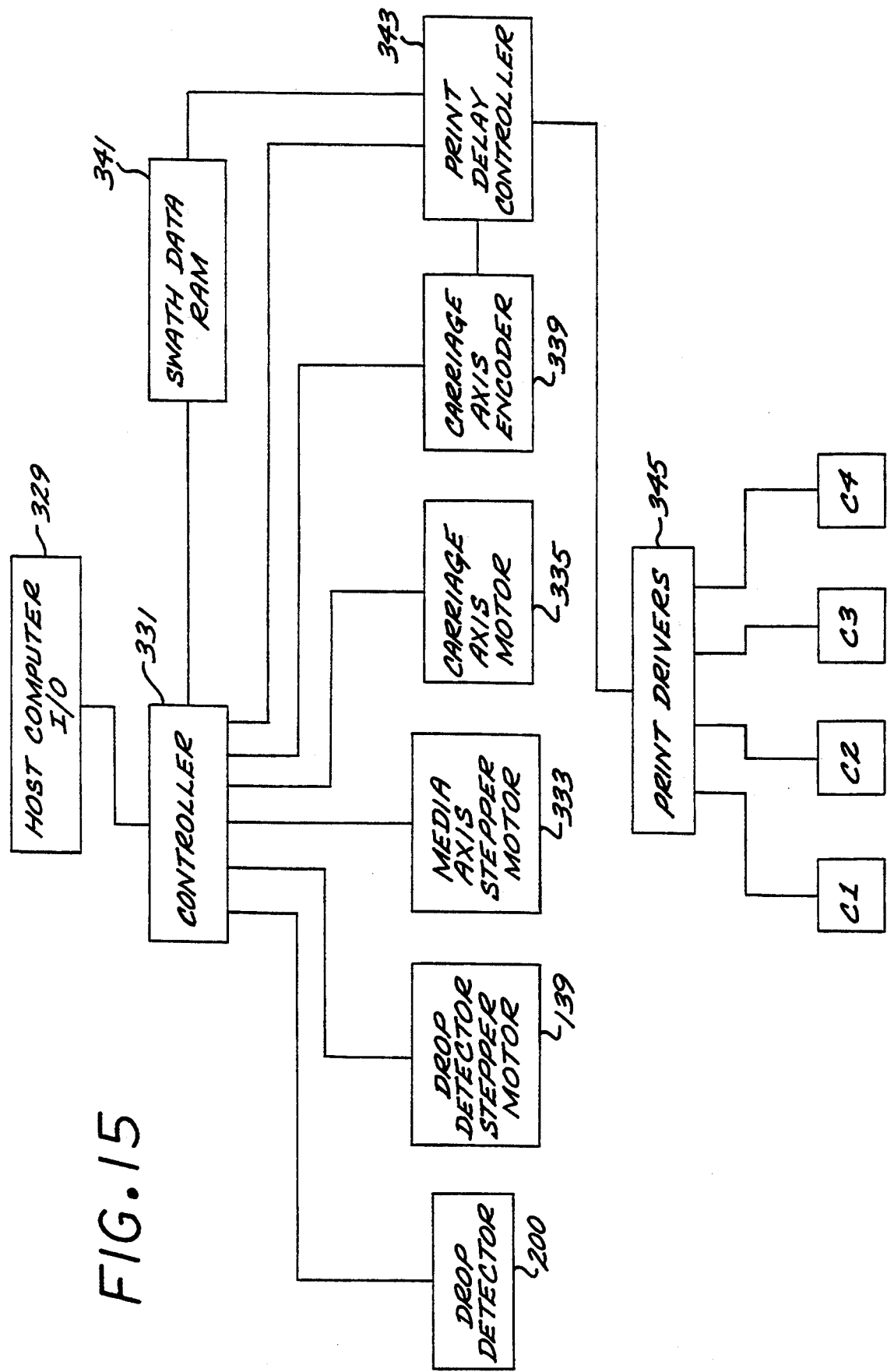
FIG. 15 is a simplified block diagram of a printer controller system for controlling operation of the color ink jet printer of FIG. 1.

Referring now to FIG. 15, set forth therein by way of illustrative example is a generalized block diagram of a printer control system that controls the operation of the above described printer, and particularly the operation of the printer as to alignment of the cartridges C1, C2, C3, C4. The control system includes a main controller 331 which controls a media axis stepper motor 333 that moves the print roller 63 pursuant to media motion commands from the controller 331. The control system further includes a carriage axis encoder 339 that provides feedback information to the controller 331 for the feedback control of a carriage scan axis drive motor 335 which positions the carriage 51 pursuant to carriage motion commands from the controller 331. The aperture plate stepper motor 139 positions the support plate 127 for the aperture plate 125 pursuant to commands from the controller 331, while the drop detector 200 operates pursuant to control by the controller 331 which receives and processes the outputs of the drop detector. The control system also includes swath data random access memory (RAM) 341 in which the controller 331 stores raster data, for example pursuant to receipt and appropriate processing of print data from a host computer 329. As discussed further herein, the controller 331 maps the swath data for each cartridge such that the row position of the data is shifted to compensate for the media axis offsets between the cartridges. A print delay controller 343 sets delays as determined by the controller for compensating for carriage axis offsets between the cartridges C1, C2, C3, C4. The print delay controller 343 controls print drivers 345 which provide ink firing pulses to the nozzles of the print cartridges C1, C2, C3, C4.

The offsets between the cartridges C1, C2, C3, C4 are effectively distances between datums consistently located on each of the cartridges, and FIG. 3 illustrates by way of illustrative example a coordinate system that can be utilized to define the direction and magnitude of the interpen offsets. The origin of the interpen offset media feed or X-axis is defined by nozzle 1 of the yellow cartridge C3, while the origin of the interpen offset carriage scan or Y-axis is defined by nozzle 1 of the black cartridge C4. With the interpen offset coordinate system thus defined, the offset of each pen is conveniently represented by respective ordered pairs (x,y) for the respective locations of nozzles 1 of each pen. Thus, the cyan cartridge C1 is located at $(x_c,y_c)$, the magenta cartridge C2 is located at $(x_m,y_m)$, the yellow cartridge C3 is located at $(x_y,y_y)$, and the black cartridge C4 is located at $(x_k,y_k)$. The number 1 nozzles of the cartridges might not necessarily be utilized to determine interpen offsets, but since the position of the number 1 in a cartridge relative to other nozzles is precisely controlled, the offsets expressed in terms of positions of other nozzles are readily translated to positions of the number 1 nozzles. For consistency with the print scan direction as shown in FIG. 3 as well as in FIG. 13 depicting the aperture plate 125, carriage scanning for carriage axis offset determination will be in the same direction.

Figure 16:
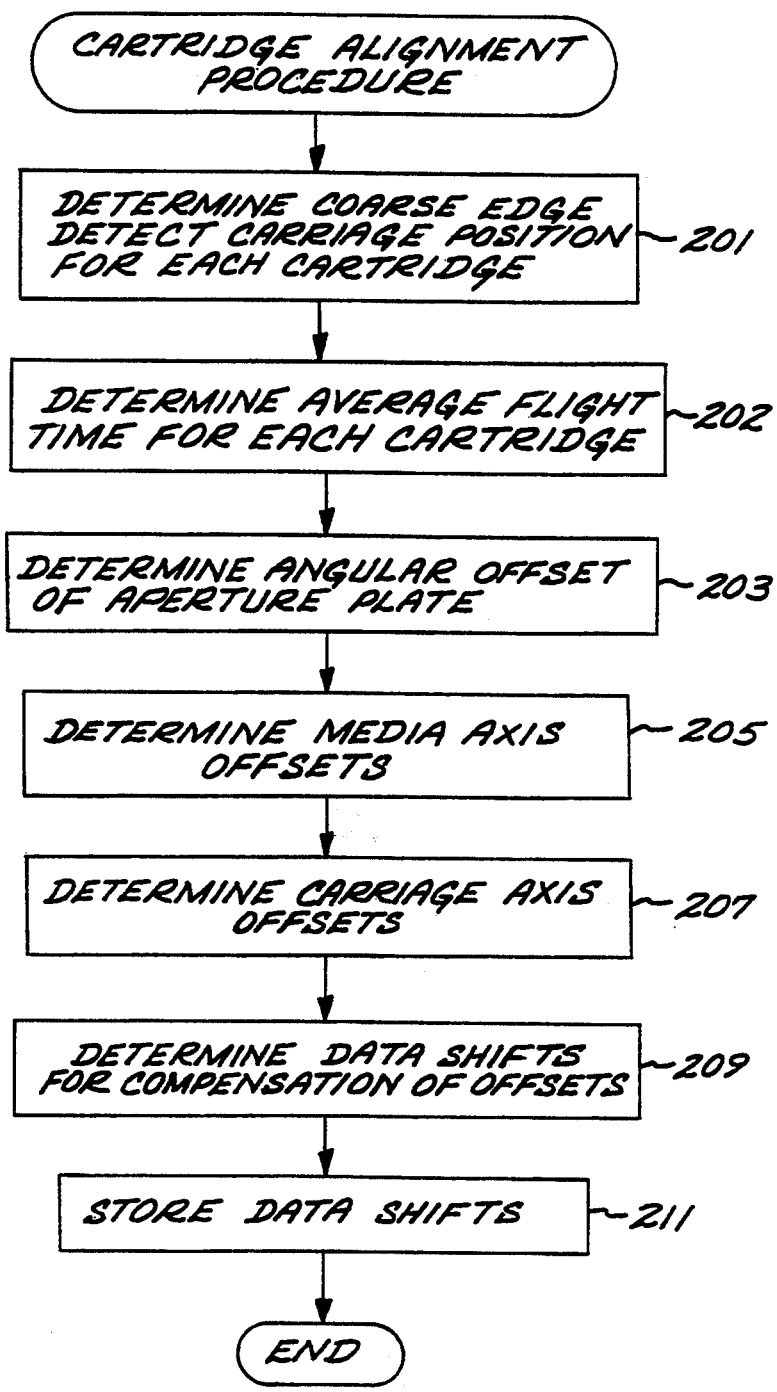
FIG. 16 is a flow diagram of a general procedure for alignment of the multiple printhead cartridges of the printer of FIG. 1.

Referring now to FIG. 16, set forth therein is an overall procedure for alignment of the cartridges C1, C2, C3, C4. At 201 a coarse edge detect carriage position is determined for each of the cartridges. Such coarse edge detect carriage position is determined by scanning a cartridge at a coarse resolution such as 300 dpi across the center slot while firing a single nozzle. This information can be utilized to coarsely position the cartridges as required for offset measurements as described further herein. At 202 the average drop flight time for each of the cartridges is determined, for example by measuring the flight times of drops from each of the nozzles of a cartridge and then averaging the measured flight times. At 203 the angular offset of the aperture plate 125 is measured, which identifies the angular offset of the longitudinal axis of the aperture plate relative to a line perpendicular to the carriage scan axis. At 205 the media axis offsets are measured, at 207 the carriage scan offsets are measured. At 209 the data shifts for compensating the measured offsets are determined, and at 211 the data shifts are stored appropriately.

Figure 17:
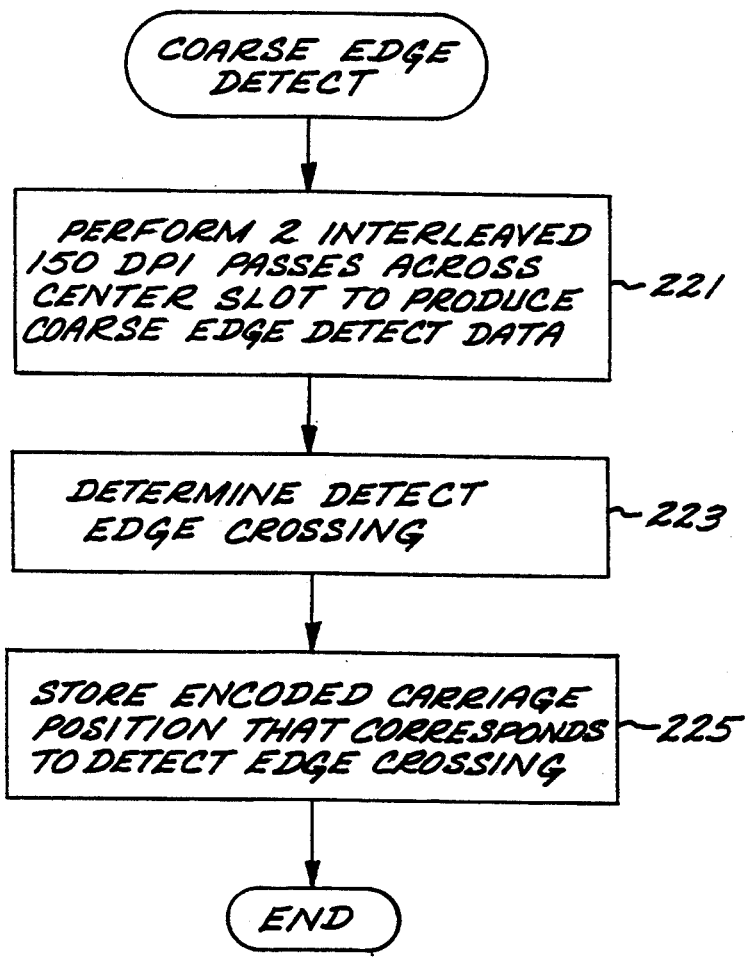
FIG. 17 is a flow diagram for determining coarse carriage positions for each of the printhead cartridges of the printer of FIG. 1 at which the nozzle arrays thereof are over a detect edge of a slot in an aperture plate that is utilized in conjunction with determining offsets between the printhead cartridges.

Referring now to FIG. 17, set forth therein by way of illustrative example is a procedure for determining a coarse edge detect carriage position for a cartridge. At 221 the cartridge is scanned two times across the center slot of the aperture plate in an interleaved manner wherein each scan prints on a 150 dpi grid and the second grid is shifted relative to the other by 1/300 inch. The edge detect data for both scans are interleaved to achieve composite coarse edge detect data that is equivalent to a single 300 dpi scan. At 223 the composite coarse edge detect data is analyzed to determine the carriage position at the time the firing nozzle traversed the detect edge of the center slot 133. At 225 the encoded carriage position corresponding to edge traversal (e.g., a valid detect to no-detect transition in the edge detect data) is stored.

Figure 18A:
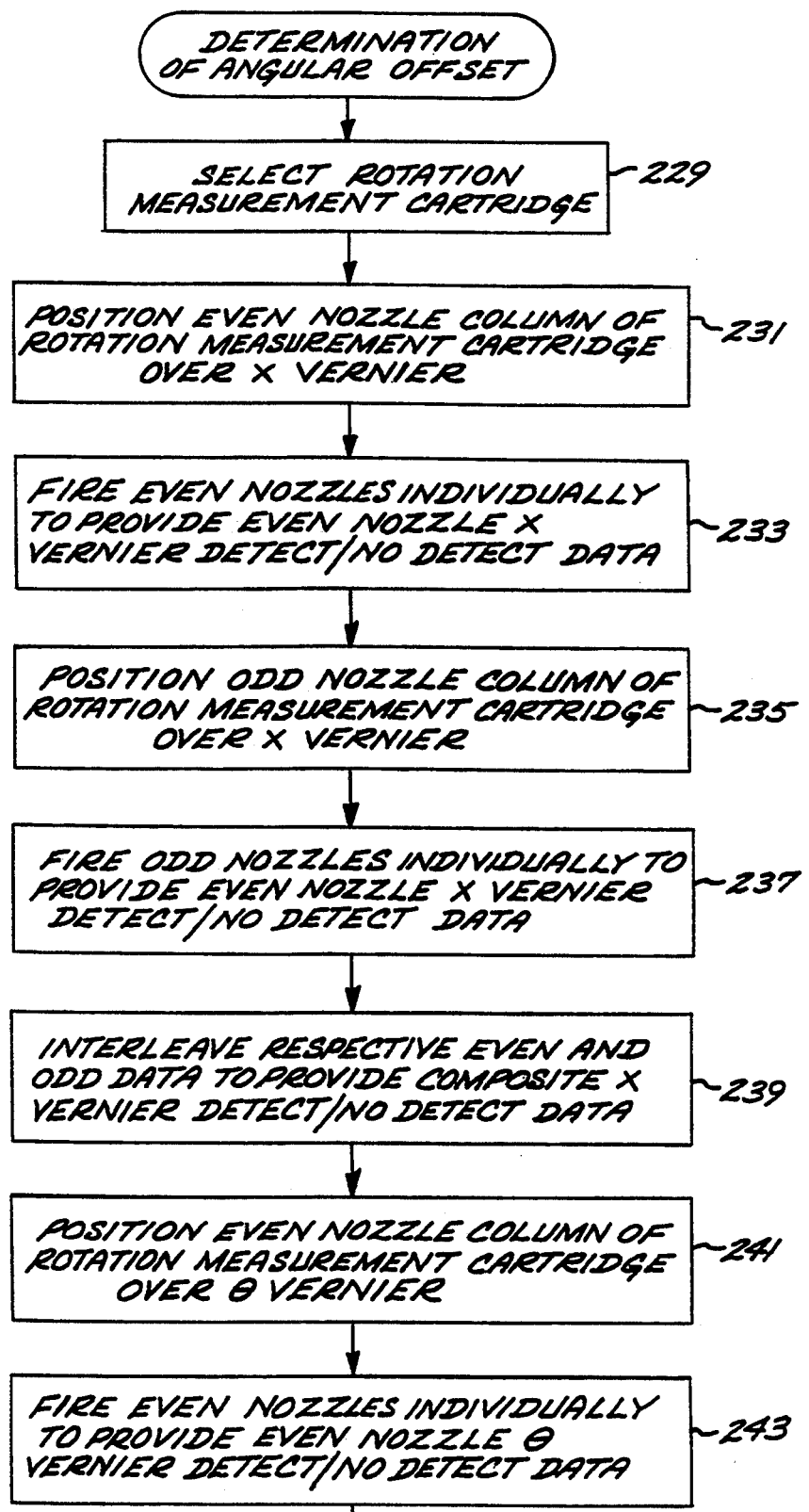
FIGS. 18A and 18B set forth a flow diagram of a procedure for measuring the angular offset of the aperture plate of the printer of FIG. 1 relative to the carriage axis.
Figure 18B:
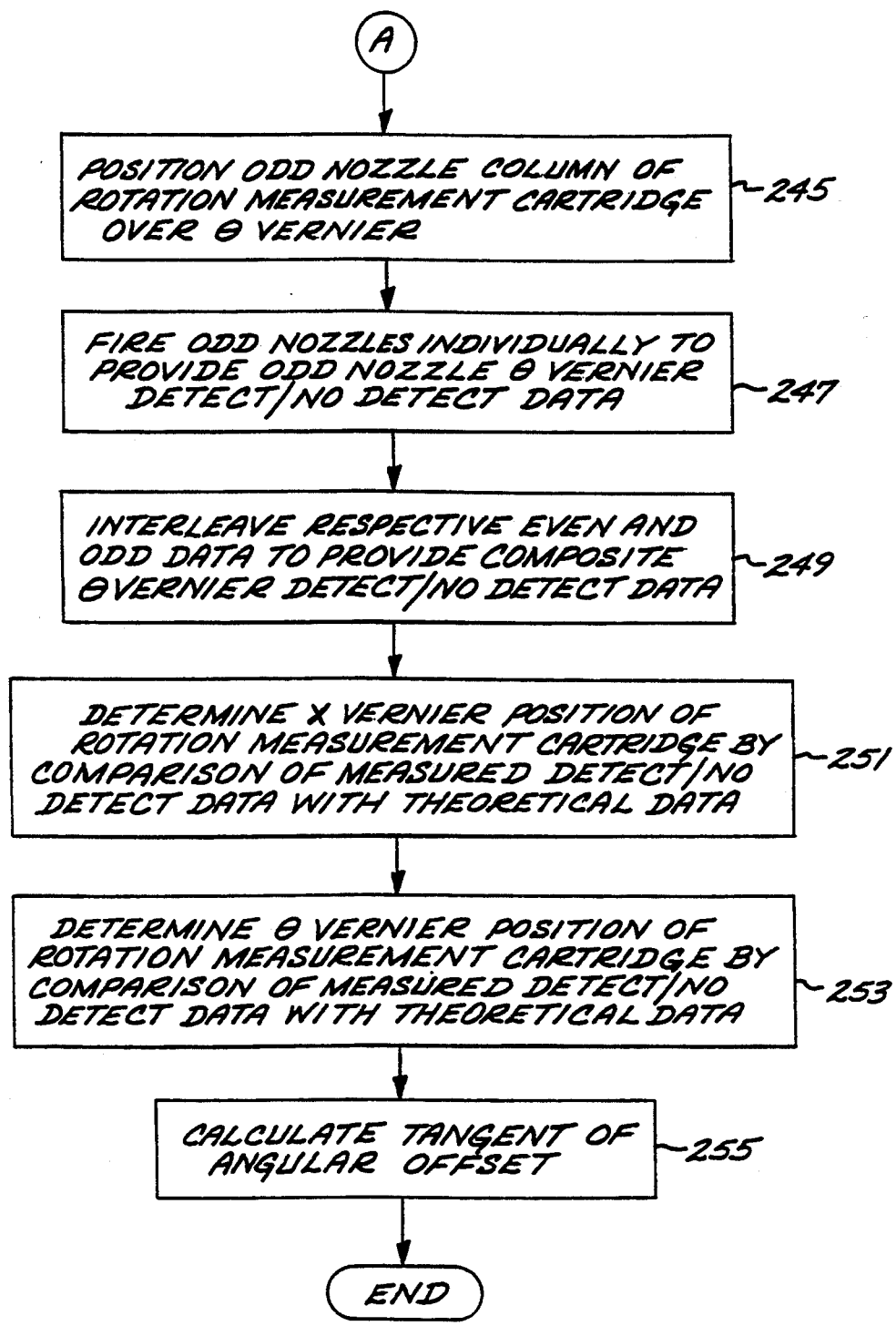

Referring now to FIGS. 18A and 18B, set forth therein by way of illustrative example is a procedure for measuring the angular offset of the aperture plate 125 relative to the carriage scan axis. At 229 one of the cartridges, for example the black cartridge C4, is selected for use as the rotation measurement cartridge. At 231 the even nozzle column of the rotation measurement cartridge is over the X vernier. At 233 the even nozzles are fired individually and in succession, for example from nozzle 2 to nozzle 50, to produce X vernier detect/no detect data which is the result of drops from some of the nozzles passing through the openings of the X vernier (detected) and drops from other nozzles being blocked by the solid regions between the vernier openings (not detected). At 235 the odd nozzle column of the rotation measurement cartridge is over the X vernier pattern, and at 237 the odd numbered nozzles are individually fired in succession to produce an odd nozzle X vernier detect/no detect data which is interleaved at 239 with the even nozzle X vernier detect/no detect data and stored as X vernier data for the rotation measurement cartridge. At 241 the even nozzle column of the rotation measurement cartridge is over the $\theta$ vernier. At 243 the even nozzles are fired individually and in succession, for example from nozzle 2 to nozzle 50, to produce even nozzle $\theta$ vernier detect/no detect data. At 245 the odd nozzle column of the rotation measurement cartridge is over the $\theta$ vernier pattern, and at 247 the odd numbered nozzles are individually fired in succession to produce an odd nozzle $\theta$ vernier detect/no detect data which is interleaved at 249 with the even nozzle $\theta$ vernier detect/no detect data and stored as $\theta$ vernier data for the rotation measurement cartridge.

At 251 the X vernier position $XV_r$ of the rotation measurement cartridge is determined by comparing the measured X vernier data with theoretically generated patterns which respectively correspond to particular cartridge positions along the vernier; and at 253 the $\theta$ vernier position $\theta V_r$ of the rotation measurement cartridge is determined by comparing the measured $\theta$ vernier data with theoretically generated patterns which respectively correspond to particular cartridge positions along the vernier. At 255 the tangent of the angular offset $\theta$ of the aperture plate is calculated, for example by dividing the difference between the two vernier positions by the difference between the encoded carriage positions $Y_x$, $Y_\theta$ of the carriage when the rotation measurement cartridge was positioned over the verniers for the even nozzle firing or the odd nozzle firing (i.e., the carriage positions $Y_x$, $Y_\theta$ can be the even nozzle firing positions or the odd nozzle firing positions):

$$\tan\theta = (XV_r - \theta V_r) \quad \text{(Equation 1)}$$

By way of illustrative example, the comparison of measured vernier data to theoretically generated vernier data can be achieved as follows. If M(i=1, MAX) is the measured vernier data array having MAX data points and Tn(i=1, MAX) is the $n^{th}$ theoretical vernier data array, a comparison between the measured data array and the $n^{th}$ theoretical vernier data array is computed by:

$$Cn = SUM(|M(i) - Tn(i)|); \, i=1 \text{ to } 50 \quad \text{(Equation 2)}$$

The minimum value of Cn for all comparisons of a measured vernier data array with the theoretical vernier data arrays indicates the best match, and the vernier position associated with the minimum Cn is assigned to the cartridge relative to the particular vernier utilized to produce the measured vernier data. By way of illustrative example, the vernier position can be expressed in terms of fractional dot rows on a particular side of the vernier wide solid region 155 that corresponds to the cartridge that produced the vernier data, with an appropriate sign indicating direction from the pertinent vernier wide solid region.

Figure 19:
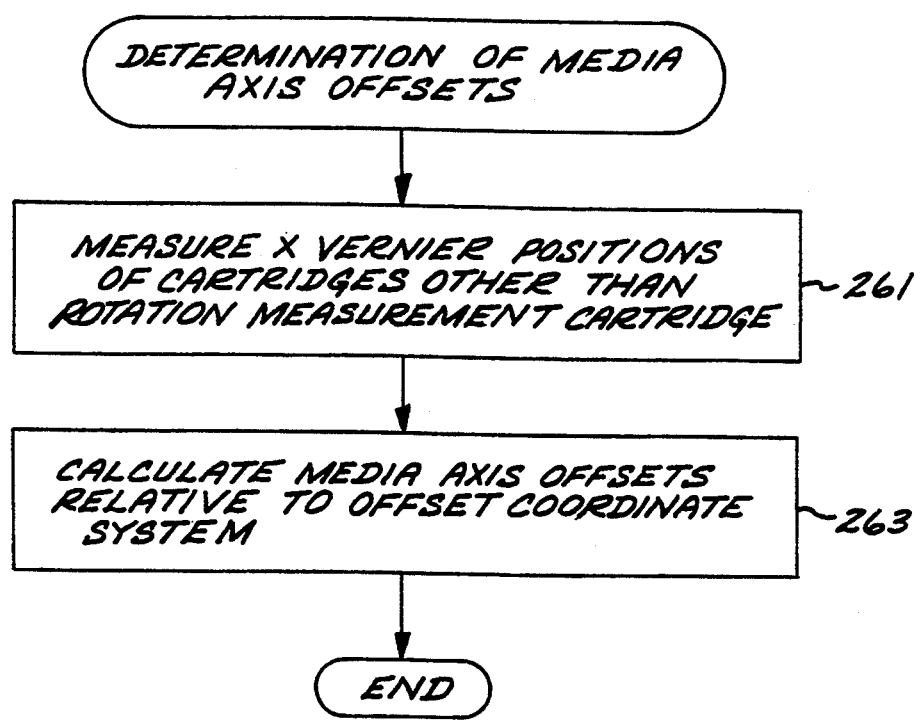
FIG. 19 is a flow diagram of a procedure for measuring the media axis offsets of the multiple cartridges of the printer of FIG. 1.

Referring now to FIG. 19 set forth therein by way of illustrative example is a procedure for measuring the media axis offsets of the cartridges. At 261 the respective X vernier positions for the cartridges not utilized for the rotation measurement are respectively determined in the same manner described previously for determining the X-vernier position of the rotation measurement cartridge. At 263 the respective X vernier positions XVc, XVm, XVy, XVk (in fractional dot rows relative to respective vernier wide solid regions) for the respective cyan, magenta, yellow, and black cartridges are utilized to determine X-axis offsets Xc, Xm, Xy, Xk in terms of the offset coordinate system of FIG. 3:

$$Xc = XVc + 2S - XVy \quad \text{(Equation 3)}$$

$$Xm = XVm + 1S - XVy \quad \text{(Equation 4)}$$

$$Xy = XVy - 0S - XVy = 0 \quad \text{(Equation 5)}$$

$$Xk = XVk + 1S - XVy \quad \text{(Equation 6)}$$

wherein S is center to center distance between the vernier wide solid regions 155 in units of fractional dot rows. These offsets are shown in FIG. 3 for the number 1 nozzles of the cartridges.

Figure 20A:
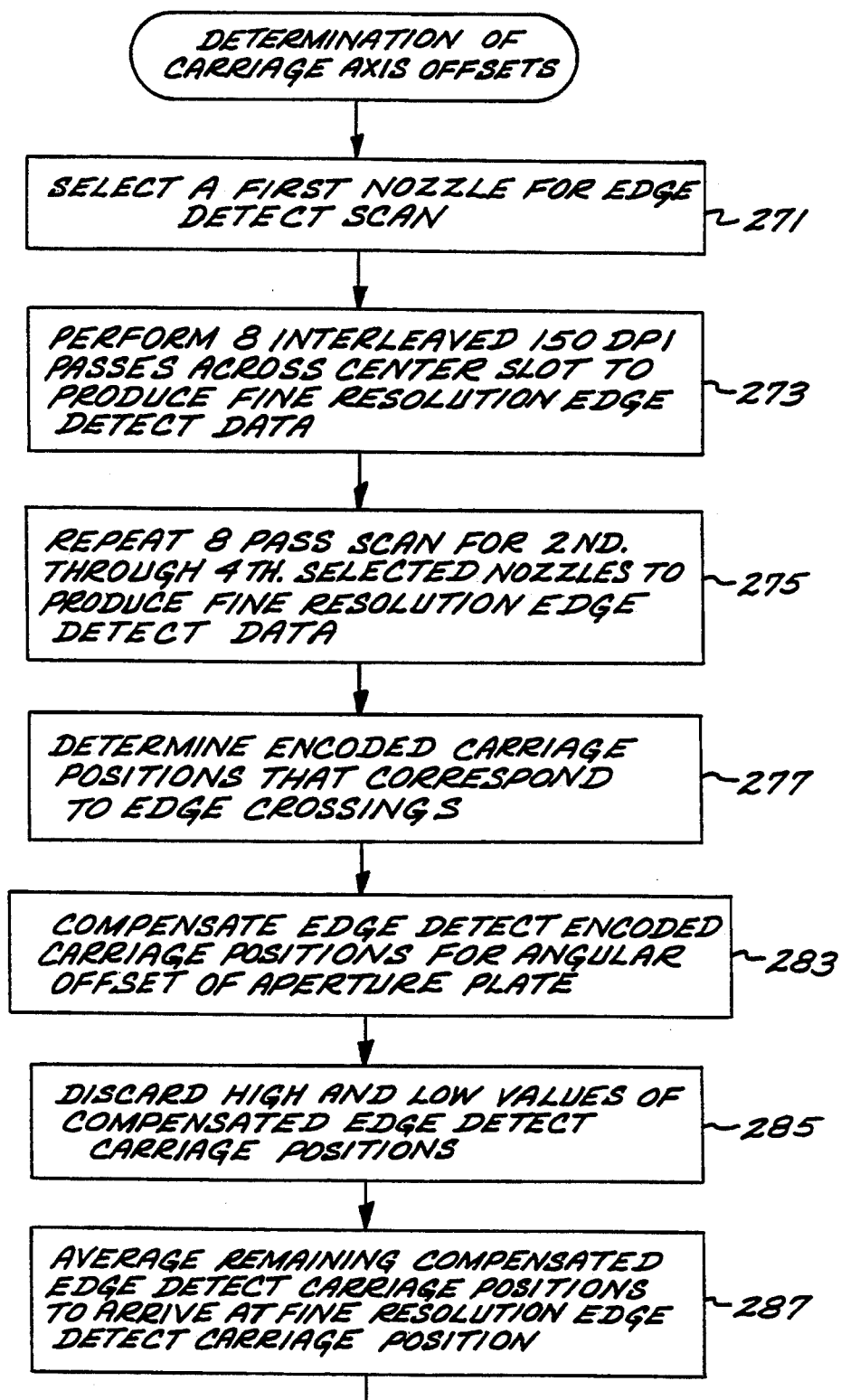
FIGS. 20A and 20B set forth a flow diagram of a procedure for measuring the carriage axis offsets of the multiple cartridges of the printer of FIG. 1.
Figure 20B:
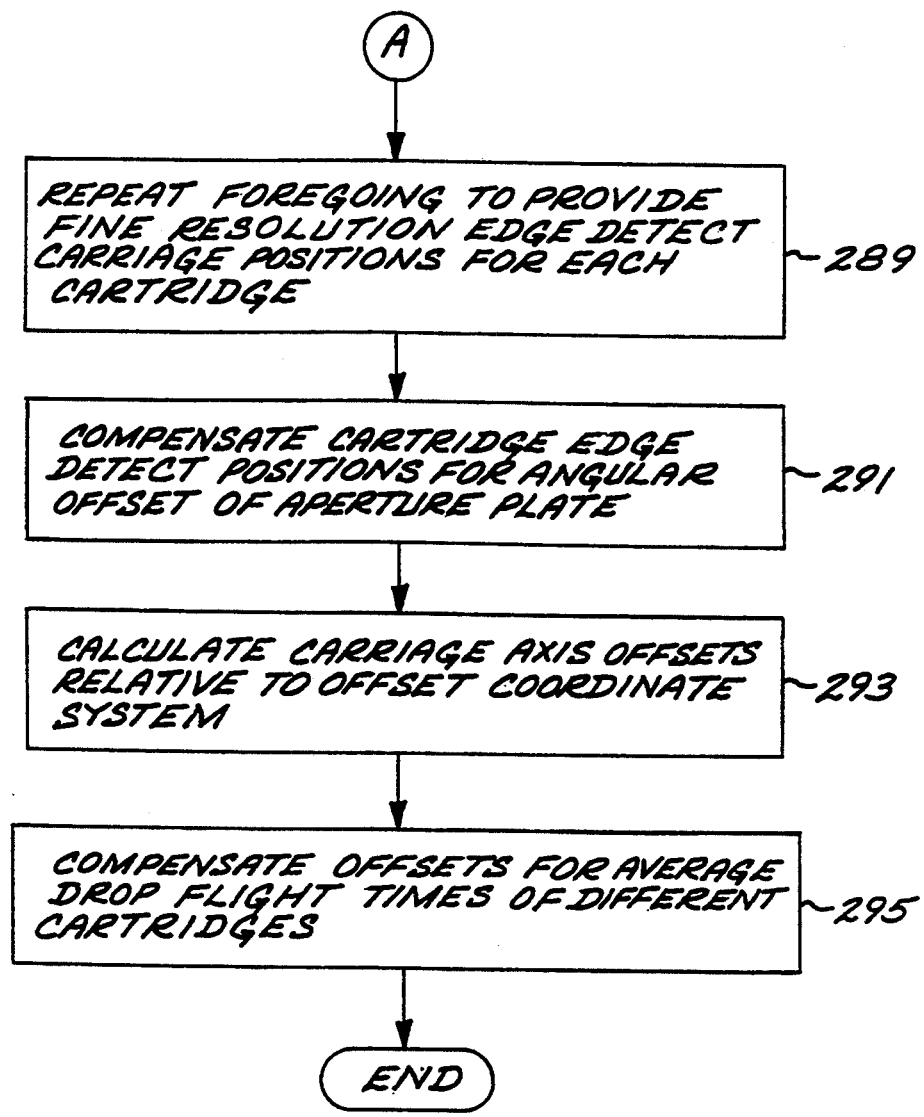

Referring now to FIGS. 20A and 20B, set forth therein by way of illustrative example is a procedure for measuring the carriage scan offsets between the cartridges C1, C2, C3, C4. At 271 a cartridge is selected, and at 273 a first nozzle of the selected cartridge is selected. At 275 the selected cartridge is scanned eight times across the center slot of the aperture plate in an interleaved manner wherein each scan prints on a 150 dpi grid and each grid is offset from the previous grid by 1/1200. The edge detect data for all eight passes are interleaved to provide a composite fine resolution edge detect data array that is equivalent to a single 1200 dpi pass. The foregoing technique for achieving 1200 dpi resolution pursuant to interleaved scans is based on an implementation wherein the drop detector has a 500 Hz limit and the carriage velocity cannot be adequately regulated at scan speeds below 3.33 ips.

At 275 the eight scan procedure is performed for each of second through fourth selected nozzles to produce respective composite fine resolution edge detect data arrays for the second through fourth selected nozzles. At 277 the composite fine resolution edge detect data arrays are analyzed to determine the encoded carriage positions of the respective detect edge traversals of the selected nozzles. For example, the width of the center slot can be selected to insure a minimum number of detects before detect edge traversal, such that edge traversal is indicated by a transition in the edge detect data from the minimum number of detects to no detects, such as a data string "11100" wherein a "1" represents a detect, a "0" represents a no detect, and the width of the center slot insures a minimum of three detects. By way of illustrative example, the encoded carriage positions corresponding to the "0" following the "111" sequence in the edge detect data arrays for the selected nozzle are assigned as the respective fine resolution edge detect carriage positions for the selected nozzles.

At 283 the fine resolution edge detect encoded carriage positions for the selected nozzles are compensated relative to a reference nozzle for the angular offset of the aperture plate. This can be achieved since the geometrical relationship of the nozzles is precisely known, and the angular offset was previously measured. The rotationally compensated carriage position $P_{comp}$ for each selected nozzle having a fine resolution edge detect encoded carriage position $P_{enc}$ is:

$$P_{comp} = P_{enc} - \Delta n * \tan\theta \quad \text{(Equation 7)}$$

where $\Delta n$ is the distance from the reference nozzle to the selected nozzle, wherein $\Delta n$ is positive in the media advance direction, and $\tan\theta$ was determined earlier as pursuant to the measurement of the angular offset of the aperture plate.

At 285 the high and low values of the compensated edge detect carriage position values for the selected nozzles are discarded, and at 287 the remaining two compensated edge detect carriage position values are averaged to arrive at cartridge fine resolution edge detect carriage position for the selected cartridge.

At 289 the foregoing is repeated for each of the remaining cartridges to generate a cartridge fine resolution edge detect carriage positions for each of the remaining cartridges. At 291 the cartridge fine resolution edge detect carriage positions are compensated on a cartridge to cartridge basis for the rotational offset of the aperture plate, with one of the cartridges being the reference cartridge. The foregoing equation utilized for nozzle to nozzle compensation can be utilized the media axis offsets were previously measured.

At 293 the rotationally compensated fine resolution edge detect carriage positions edge detect carriage positions Pc, Pm, Py, Pk for the cyan, magenta, yellow and black cartridges C1, C2, C3, C4 for the cartridges are utilized to determine carriage scan axis offsets Yc, Ym, Yy, Yk in terms of the offset coordinate system of FIG. 3:

$$Yc = Pc - Pk \quad \text{(Equation 8)}$$

$$Ym = Pm - Pk \quad \text{(Equation 9)}$$

$$Yy = Py - Pk \quad \text{(Equation 10)}$$

$$Yk = Pk - Pk = 0 \quad \text{(Equation 11)}$$

At 295, the foregoing carriage axis offsets are further compensated for differences in the average ink drop velocities of the cartridges. Since the distance between the nozzle plates and the optical drop detection zones is known, average drop velocities can be determined by measuring average drop flight times for each of the cartridges, for example by appropriate positioning of the nozzle columns of the arrays over the center aperture 133 of the aperture plate, measuring the respective time intervals between firing and drop detect for each of the nozzles, and averaging the flight times of the nozzles of each cartridge. The measured average flight times and the physical characteristics of the printer provide the following drop velocity errors of the yellow, magenta, cyan, and black cartridges relative to the black cartridge (which is the origin for carriage axis offsets):

$$E_{ck} = (T_c - T_k) * [(Hp/Hd)CVp - CVd] \quad \text{(Equation 12)}$$

$$E_{mk} = (T_m - T_k) * [(Hp/Hd)CVp - CVd] \quad \text{(Equation 13)}$$

$$E_{kk} = (T_y - T_k) * [(Hp/Hd)CVp - CVd] \quad \text{(Equation 14)}$$

$$E_{kk} = (T_k - T_k) * [(Hp/Hd)CVp - CVd] \quad \text{(Equation 15)}$$

wherein Hp is the nozzle plate to print media distance, Hd is the nozzle plate to optical detection zone distance, CVp is the carriage velocity during printing, and CVd is the carriage velocity during flight time measurement.

The drop velocity or flight time compensated carriage axis offsets Y'c, Y'm, Y'y and Y'k are as follows:

$$Y'c = Yc - E_{ck} \quad \text{(Equation 16)}$$

$$Y'm = Ym - E_{mk} \quad \text{(Equation 17)}$$

$$Y'y = Yy - E_{yk} \quad \text{(Equation 18)}$$

$$Y'k = Yk - E_{kk} = 0 \quad \text{(Equation 19)}$$

The media axis and drop velocity compensated carriage axis offsets determined pursuant to the foregoing are utilized to determine appropriate delays or shifts for the printing operations of the different cartridges. In particular, the operations of the cyan, magenta and yellow cartridges C1, C2, C3 along the carriage scan axis are respectively delayed by the print delay controller relative to the operation of the black cartridge C4 which is the first cartridge to encounter the print media along the carriage scan axis. And the operations of the cyan, magenta and black cartridges C1, C2, C4 along the media scan axis are delayed relative to the operation of the yellow cartridge C3 which is the first cartridge to encounter the print media along the media scan axis.

By way of illustrative example, the swath data for each cartridge is mapped such that the row position of the data accounts for the offsets, while column position of the data corresponds to column position on the print media. This can be better understood by visualizing the raster data for each cartridge as a matrix 1's and 0's which are displaced relative to each other along the row direction by shifts that are based on the offsets. The row displacement provides the appropriate delays along the media axis for the cyan, magenta, and black cartridges C1, C2, C4, while delay in data fetching can be utilized to provide delays along the carriage axis for the cyan, magenta and yellow cartridges C1, C2, C3. For example, data fetching delay for a particular cartridge can be implemented by loading a counter with a negative number representative of the carriage axis shift for that cartridge. The counter increments at each dot column position as the carriage scans in the print scan direction, and data fetching from swath RA34 begins when the counter reaches zero.

Data shifts based on the measured media scan offsets $X_c$, $X_m$, $X_k$ and drop velocity compensated carriage scan offsets $Y_c$, $Y_m$, $Y_y$ are determined, for example, in a manner that minimizes the maximum cartridge to cartridge error for implementations that utilize integral dot shifts based on offsets that are in fractional dots. Such optimization of data shifts can be based on calculations of print positions for different data shifts based on the measured offsets, as described below for carriage scan offsets.

Figure 21:
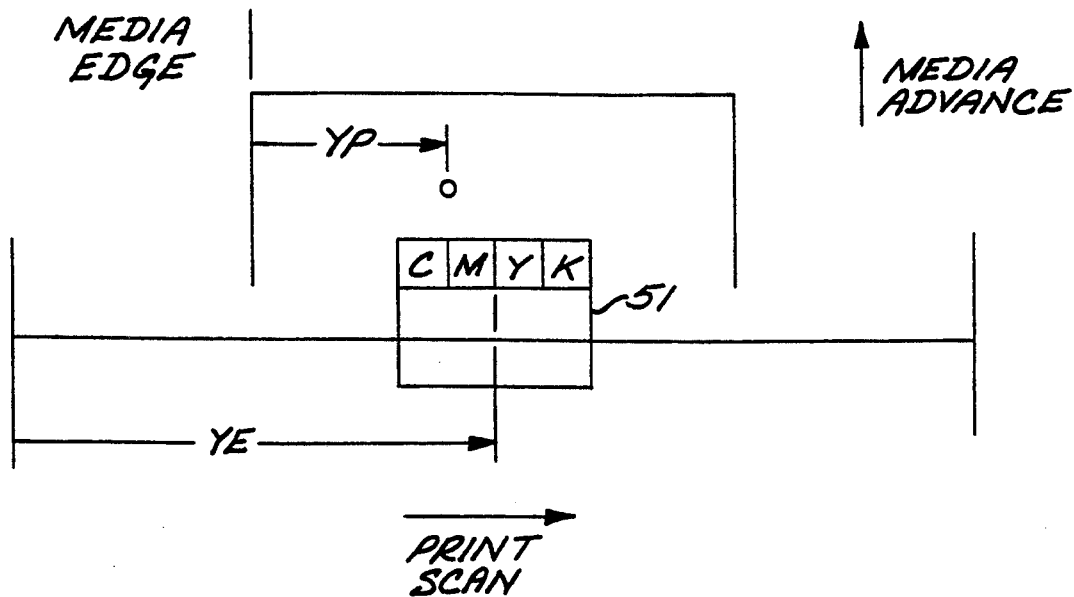
FIGS. 21 and 22 are schematic top plan views illustrating the relationship between print position and the print media and encoded carriage position.
Figure 22:
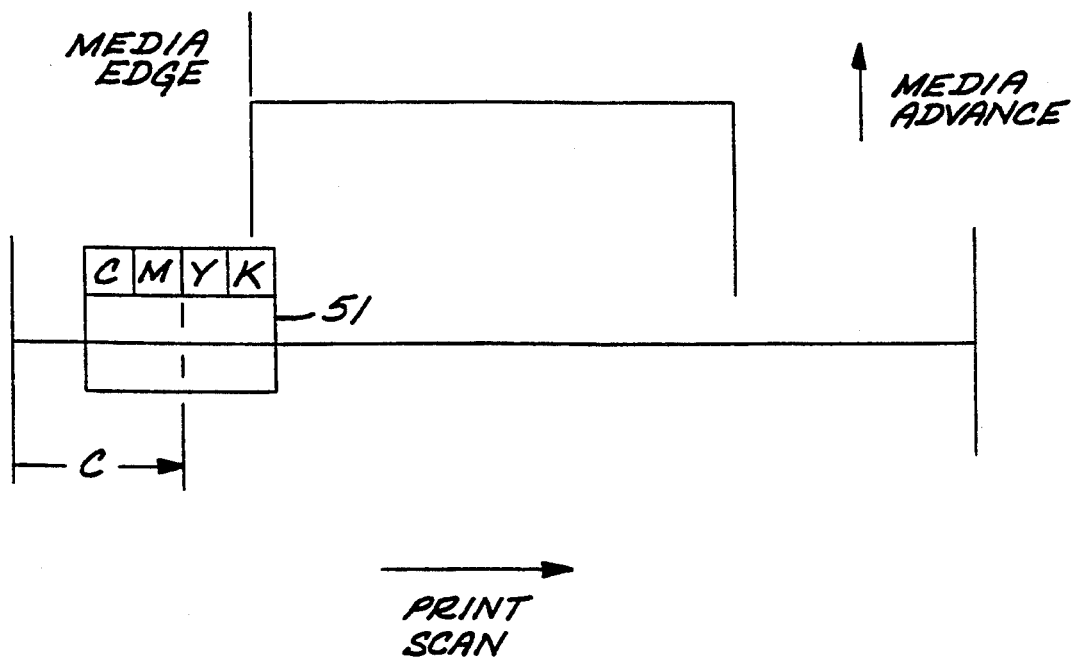

The carriage axis print positions YP for each of the cartridges can be expressed as follows in terms of a given encoded carriage position YE, which for convenience increases along the print scan direction:

$$YP_k = YE - (C + SHIFT_k) \quad \text{(Equation 21)}$$

$$YP_y = YE - (C + SHIFT_y) \quad \text{(Equation 22)}$$

$$YP_m = YE - (C + SHIFT_m) \quad \text{(Equation 23)}$$

$$YP_c = YE - (C + SHIFT_c) \quad \text{(Equation 24)}$$

wherein C is the encoded carriage position that positions the black cartridge over the left edge of the media as illustrated in FIGS. 21 and 22. From the foregoing print position equations, print positions are calculated from four sets of different integral values of the SHIFTs.

The first set of positions is based on upward rounding of the offsets, to arrive at the following first set of SHIFTs:

$$SHIFT_k(1) = 0 \quad \text{(Equation 25)}$$

$$SHIFT_y(1) = INT(Y_y + 1) \quad \text{(Equation 26)}$$

$$SHIFT_m(1) = INT(Y_m + 1) \quad \text{(Equation 27)}$$

$$SHIFT_c(1) = INT(Y_c + 1) \quad \text{(Equation 28)}$$

If these shifts were to be applied to print dots of each cartridge color at the same encoder position on a given row, the result would be three non-black dots to the right of the black dot, with the particular order of nonblack dots depending on the carriage scan offsets, as schematically illustrated in FIG. 23A in exaggerated form for the example of cyan, magenta and yellow in increasing distance from the black dot. The distance E1 between the distal dots for the first set of shifts is calculated, for example by subtracting the highest print position from the lowest print position as defined by the first set of shifts, which in this example would be:

$$E1 = INT(Y_y+1) - Y_y \quad \text{(Equation 29)}$$

The second set of shifts is based on shifting the leftmost dot resulting from the first set of shifts to the right by one dot row, which would be the black dot irrespective of the order of the color dots:

$$SHIFT_k(2) = 1 \quad \text{(Equation 30)}$$

$$SHIFT_y(2) = INT(Y_y+1) \quad \text{(Equation 31)}$$

$$SHIFT_m(2) = INT(Y_m+1) \quad \text{(Equation 32)}$$

$$SHIFT_c(2) = INT(Y_c+1) \quad \text{(Equation 33)}$$

The effect of the second set of shifts is shown in FIG. 23B. The distance between distal dots is calculated for the second set of shifts, which in this example is the distance from the cyan dot to the black dot:

$$E2 = 1 - (INT(Y_c+1) - Y_c) \quad \text{(Equation 34)}$$

The third set of shifts is based on shifting the leftmost dot resulting from the second set of shifts to the right by one dot row, which would be the cyan dot in this particular example:

$$SHIFT_k(3) = 1 \quad \text{(Equation 35)}$$

$$SHIFT_y(3) = INT(Y_y+1) \quad \text{(Equation 36)}$$

$$SHIFT_m(3) = INT(Y_m+1) \quad \text{(Equation 37)}$$

$$SHIFT_c(3) = INT(Y_c+2) \quad \text{(Equation 38)}$$

The effect of the third set of shifts is schematically depicted in FIG. 23C. The distance between distal dots is calculated for the third set of shifts, which in this example is from the magenta dot to the cyan dot:

$$INT(Y_c+2) - Y_c - (INT(Y_m+1)) \quad \text{(Equation 39)}$$

The fourth set of shifts is calculated by shifting the leftmost dot resulting from the third set of shifts to the right by one dot row, which would be the magenta dot in this example:

$$SHIFT_k(4) \quad \text{(Equation 40)}$$

$$SHIFT_y(4) = INT(Y_y+1) \quad \text{(Equation 41)}$$

$$SHIFT_m(4) = INT(Y_{m+2}) \quad \text{(Equation 42)}$$

$$SHIFT_c(4) = INT(Y_c2) \quad \text{(Equation 43)}$$

The effect of the fourth set of shifts is schematically depicted in FIG. 23D. The distance between distal dots is calculated for the third set of shifts, which in this example is from the yellow dot to the magenta dot:

$$E4 = INT(Y_m+2) - Y_m - (INT(Y_y+1) - Y_y) \quad \text{(Equation 44)}$$

The set of SHIFTs that resulted in the lowest distance between distal dots is selected as the optimal shifts for the carriage axis and is stored as the carriage compensating shifts. Effectively, different sets of shifts based on the rotationally and drop velocity compensated carriage offsets are analyzed to determine the set of shifts that provides for the closest spacing of dots respectively printed by the cartridges at each given dot row. A similar procedure is utilized to determine an optimal set of shifts for the media axis. In this manner, the spread between respective dot print positions of the cartridges at each given dot position is minimized.

It should be appreciated that the procedure for determining optimal shifts is not based on actually printing dots, but is based on calculations of print positions. The schematic illustrations of FIGS. 23A-23D were provided to assist in understanding the purpose of the calculations.

The optimal media axis and carriage axis shifts are stored for use by the controller for swath data mapping for media axis compensation, and for use by the print delay controller in compensating for carriage axis offsets, as described earlier.

The foregoing has been a disclosure of apparatus and techniques that provide for precise ink drop placement alignment of the printhead cartridges of a multiple printhead cartridge ink jet printer. The disclosed apparatus and techniques particularly compensate for manufacturing tolerances of the printer as well as the cartridges, and also compensate for cartridge mounting errors that cannot be compensated by manufacturing tolerance control.

Although the foregoing has been a description and illustration of specific embodiments of the invention, various modifications and changes thereto can be made by persons skilled in the art without departing from the scope and spirit of the invention as defined by the following claims.

What is claimed is:

1. An optical ink drop detector for detecting the presence of an ink drop that passes through an aperture plate, comprising:
    a light source for providing source illumination directed toward the aperture plate;
    optical means for bending said source illumination to provide detection illumination that is parallel to and adjacent to said aperture plate;
    second optical means spaced from said first optical means for bending said detection illumination to provide sensor illumination directed away from the aperture plate; and
    an optical sensor responsive to said sensor illumination;
    whereby said detection beam defines a detection zone adjacent to the aperture plate and whereby the presence of an ink drop in the detection zone is detected by a decrease in the amount of sensor illumination detected by said optical sensor.

2. The optical ink drop detector of claim 1 wherein said first and second optical means comprise first and second light bending prisms.

3. The optical ink drop detector of claim 2 wherein said first and second light bending prisms are made by injection molding.

4. The optical ink drop detector of claim 3 wherein said first and second light bending prisms are fixedly secured relative to each other by elongated support members integrally formed with said injection molded prisms.

* * * * *